(12) United States Patent
Koreeda

(10) Patent No.: US 6,731,419 B2
(45) Date of Patent: May 4, 2004

(54) SCANNING OPTICAL SYSTEM

(75) Inventor: Daisuke Koreeda, Tokyo (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/290,161

(22) Filed: Nov. 8, 2002

(65) Prior Publication Data
US 2003/0142380 A1 Jul. 31, 2003

(30) Foreign Application Priority Data
Nov. 9, 2001 (JP) ........................................ 2001-344193

(51) Int. Cl.$^7$ .............................................. G02B 26/08
(52) U.S. Cl. ........................ 359/210; 359/204; 359/823
(58) Field of Search ................................ 359/204, 210, 359/209, 205, 819, 822, 823; 347/243, 244

(56) References Cited

U.S. PATENT DOCUMENTS

| 5,592,324 A | * | 1/1997 | Inagaki et al. ............... 359/210 |
| 6,219,082 B1 | * | 4/2001 | Rumsey et al. ............. 347/242 |
| 6,317,245 B1 | | 11/2001 | Hama et al. |
| 6,392,772 B1 | | 5/2002 | Hama et al. |
| 6,392,773 B1 | | 5/2002 | Hama et al. |
| 6,396,615 B1 | | 5/2002 | Hama et al. |

FOREIGN PATENT DOCUMENTS

JP 2001147394 5/2001

OTHER PUBLICATIONS

English Language Translation for JP Appln. No. 2001-147394.

* cited by examiner

Primary Examiner—Euncha Cherry
(74) Attorney, Agent, or Firm—Greenblum & Bernstein, P.L.C.

(57) ABSTRACT

There is provided a scanning optical system, which is provided with a deflector that deflects the plurality of beams, and an imaging optical system that converges the plurality of beams deflected by the deflector to form a plurality of beam spots on surfaces to be scanned, respectively. The imaging optical system has at least one lens whose position is changeable in a plane including an optical reference axis thereof and parallel with the main scanning direction. In this configuration, the imaging optical system satisfies a condition: $0.05<|f/fL|<0.5$, where, f represents a focal length of the imaging optical system in the main scanning direction, and fL represents a focal length of the at least one lens in the main scanning direction.

16 Claims, 13 Drawing Sheets

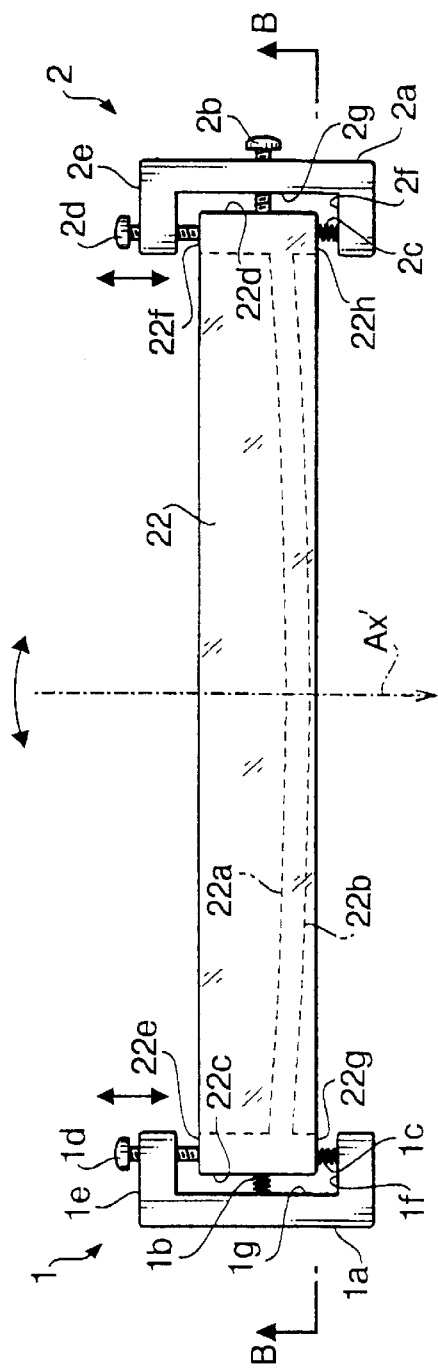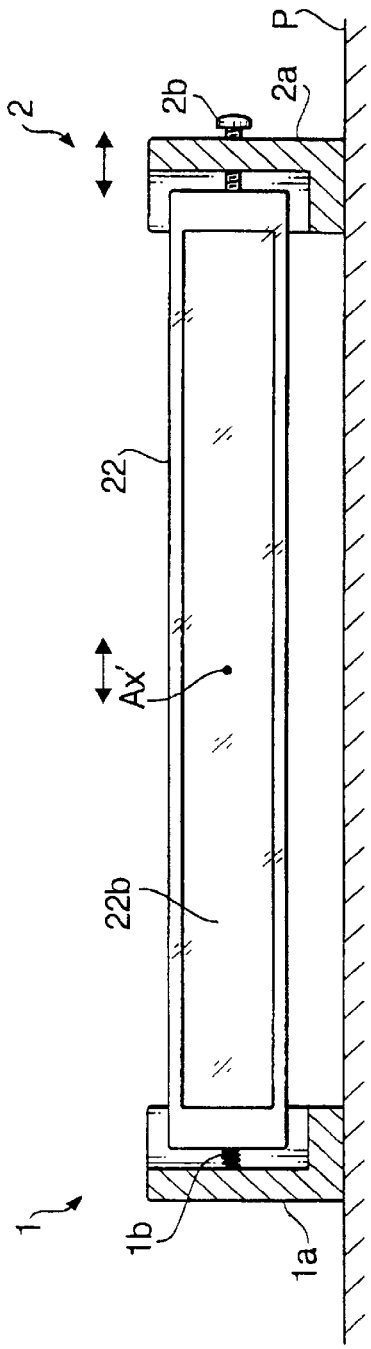

fθ ERROR CHARACTERISTIC

CURVATURE OF FIELD

......... MAIN SCANNING DIRECTION

——— AUXILIARY SCANNING DIRECTION

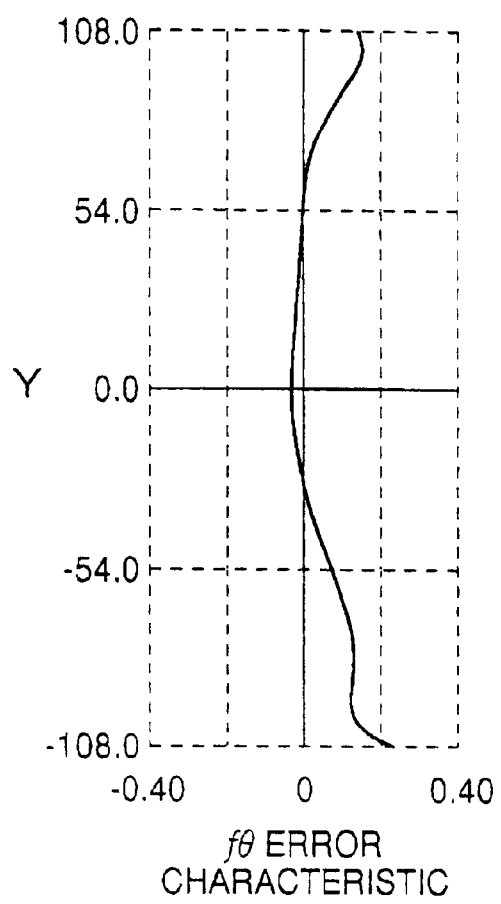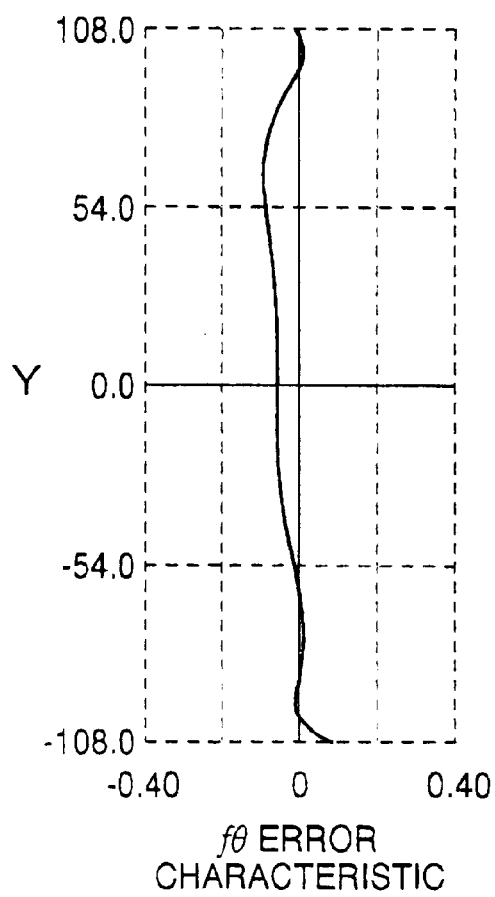
FIG. 7 fθ ERROR CHARACTERISTIC
FIG. 8 fθ ERROR CHARACTERISTIC fθ ERROR CHARACTERISTIC

CURVATURE OF FIELD

...... MAIN SCANNING DIRECTION

——— AUXILIARY SCANNING DIRECTION

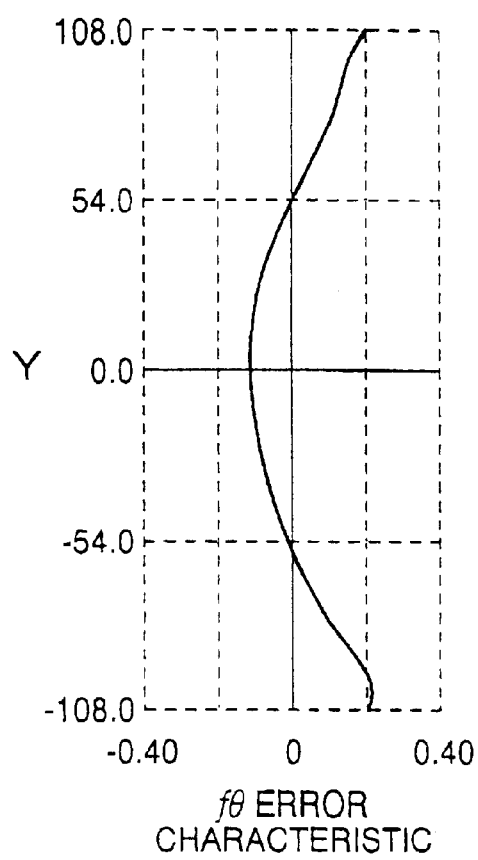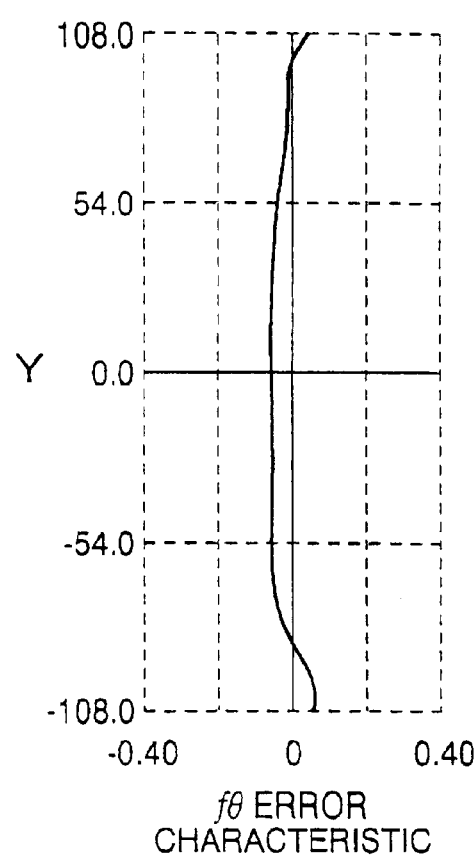

$f\theta$ ERROR CHARACTERISTIC

CURVATURE OF FIELD

······ MAIN SCANNING DIRECTION

—— AUXILIARY SCANNING DIRECTION

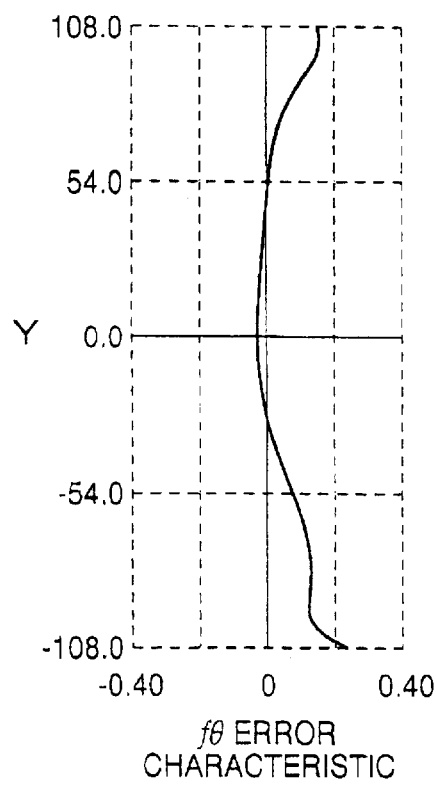 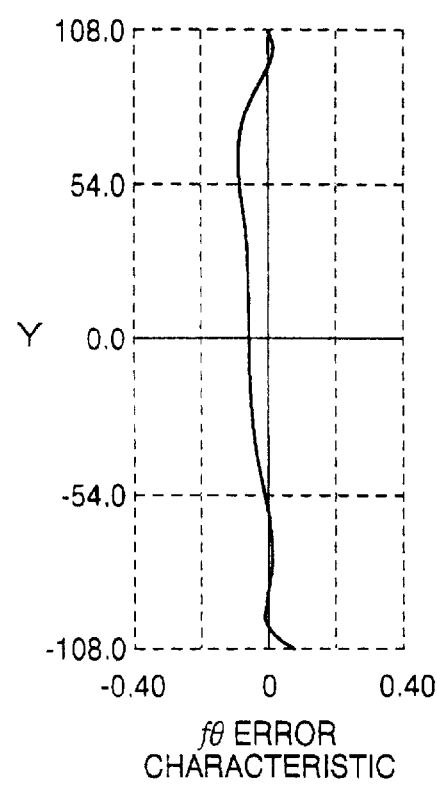
FIG.18 — fθ ERROR CHARACTERISTIC
FIG.19 — fθ ERROR CHARACTERISTIC

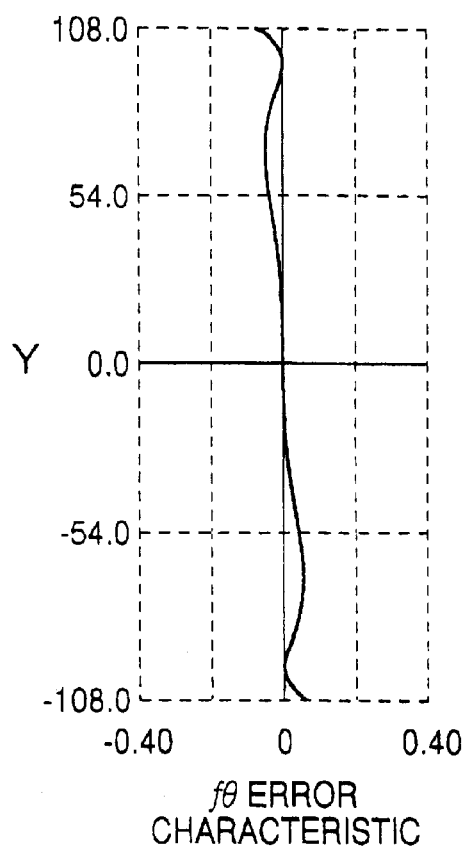
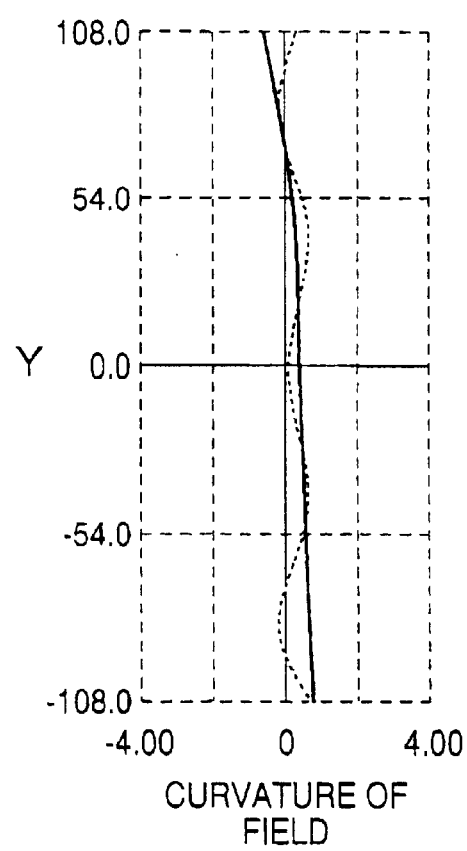
FIG.20A — fθ ERROR CHARACTERISTIC
FIG.20B — CURVATURE OF FIELD
---------- MAIN SCANNING DIRECTION
——— AUXILIARY SCANNING DIRECTION

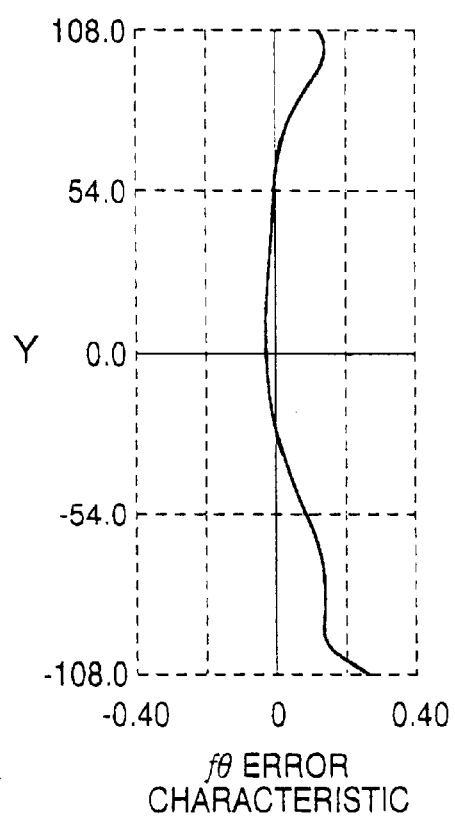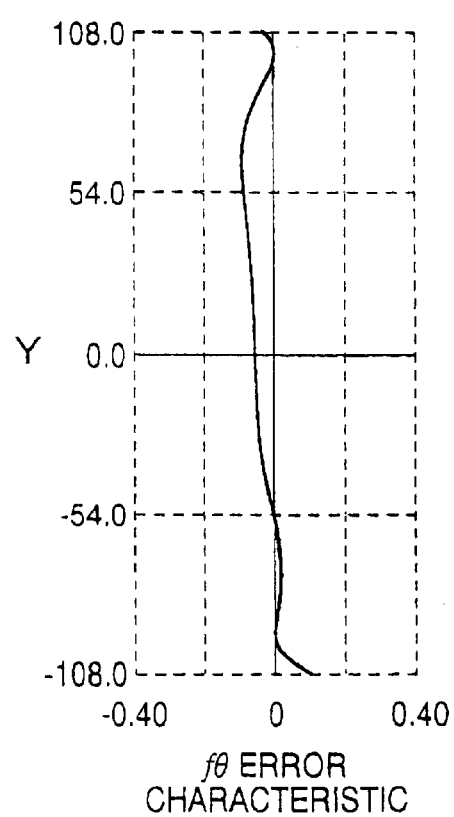

SCANNING OPTICAL SYSTEM

BACKGROUND OF THE INVENTION

The present invention relates to a scanning optical system in which a plurality of laser beams scan on a plurality of surfaces to be scanned, respectively.

An apparatus which is capable of performing color printing, such as a color laser printer, a color photo-copying apparatus or the like, is generally known. For example, in the color laser printer, a scanning optical system capable of emitting a plurality of laser beams to scan on a plurality of photoconductive drums is employed. By using this type of scanning optical system, latent images are formed on the plurality of photoconductive drums corresponding to a plurality of color components, respectively.

This type of scanning optical system is provided with a polygonal mirror which rotates about its rotational axis at constant angular speed to deflect laser beams emitted by light sources, and imaging optical systems which converge the deflected laser beams to form beam spots scanning on the photoconductive drums at constant speed, respectively. Thus, a plurality of beam spots formed on a plurality of surfaces to be scanned move along scanning lines, respectively. The extending direction of the scanning line will be referred to as a main scanning direction.

Since each of the photoconductive drums is rotated while the beam spot scans along the scanning line, a plurality of scanning lines, which are evenly spaced in an auxiliary scanning direction perpendicular to the main scanning direction, are formed on each of the photoconductive surfaces. Further, the beam spot is modulated according to image data while such a scanning operation is performed. Therefore, a two dimensional latent image is formed on each of the photoconductive surfaces.

By forming latent images respectively corresponding to the color components on the photoconductive drums, the plurality of color image components are printed, in an overlaid fashion, on the same sheet so that a color image is formed.

To scan along the scanning line at constant speed, the imaging optical system is designed to have fθ characteristics. In addition, for each of the color components, the imaging optical system having the same configuration is used.

With this configuration, it becomes possible that all the laser beams scan on the respective photoconductive surfaces at the same constant speed. In this case, if timings of the modulation for all the color components are synchronized, a dot for each of the color components is formed at the same position in the printed color image. That is, theoretically, the occurrence of the color drift in the printed image can be prevented.

However, there may be a case where speed variations of the beam spot in the main scanning direction occur due to a positional error of the imaging optical system. In such a case, even though the laser beam is modulated (i.e., the laser beam is turned to ON or OFF) at a constant time interval, a space between adjacent dots which are formed along the scanning line varies with its position. As a result, densely dotted portions and sparsely dotted portions appear along the scanning line.

In this case, it is possible to even up a writing start position and a writing end position for each color component by adjusting timings at which the modulation is started and ended for each color component. However, it is not possible to even up centers of the scanning lines for respective color components because the speed variation of the beam spots in the main scanning direction for the color components are different from each other. That is, for example, if 199 dots are included in one scanning line, the $100^{th}$ dot is not formed at the center of the scanning line.

Therefore, in this case, a dot which is to be formed at the center of the scanning line is actually formed at a position shifted from the center of the scanning line. In addition, positions of the dots of the color components are different from each other in the scanning line. If a printing operation is performed under such situations, the color drift occurs at a central portion of each of the scanning lines. As a result, in the printed color image, the color drift appears within a rectangular area extending in a vertical direction (i.e., the auxiliary scanning direction).

Therefore a scanning optical system, which is configured to prevent occurrence of the color drift at the rectangular area (i.e., the central portion) of the printed color image, is desired.

SUMMARY OF THE INVENTION

The present invention is advantageous in that it provides a scanning optical system which is capable of adjusting its fθ characteristics so that a beam spot which should be formed at a center of a scanning line is actually formed at the center of the scanning line.

According to an aspect of the invention, there is provided a scanning optical system for emitting a plurality of laser beams scanning in a main scanning direction. The scanning optical system is provided with a deflector that deflects a plurality of laser beams to scan in the main scanning direction, and an imaging optical system that converges the plurality of laser beams deflected by the deflector to form a plurality of beam spots on surfaces to be scanned, respectively, the plurality of beam spots scanning on the surfaces to be scanned in the main scanning direction, respectively.

Further, the imaging optical system has at least one lens whose position is changeable in a plane including an optical reference axis thereof and parallel with the main scanning direction.

In the above configuration, the imaging optical system satisfies a condition:

$$0.05 < |f/fL| < 0.5$$

where, f represents a focal length of the imaging optical system in the main scanning direction; and fL represents a focal length of the at least one lens in the main scanning direction.

With the above configuration, since a position of the beam spot on the surface to be scanned can be adjusted, the beam spot which should be formed at the center of the scanning line can be actually formed at the center of the scanning line. In steps of adjustment of the at least one lens, since the imaging optical system satisfies the above condition, sensitivity of the adjustment of the at least one lens becomes neither excessively low nor excessively high.

In a particular case, the at least one lens may be movable along a line parallel with the main scanning direction.

In another case, the at least one lens may be rotatable in the plane.

Optionally, the at least one lens may have a first surface which is a light incident side thereof and a second surface opposite to the first surface, at least one of the first surface and the second surface being an aspherical surface.

Further, the at least one lens satisfies a condition:

$$0.01 < |[\Delta X1(\text{max}) + \Delta X2(\text{max})]/f| < 0.1$$

where,

ΔX1(max) represents an amount of asphericity of the first surface at an outermost position on the first surface in the main scanning direction within an effective diameter of the first lens, the amount of asphericity of the first surface being defined as a difference between a SAG amount of a spherical surface having a curvature corresponding to that of the first surface at an optical reference axis thereof and tangential to the first surface at the optical reference axis and a SAG amount of the first surface;

ΔX2(max) represents an amount of asphericity of the second surface at an outermost position on the second surface in the main scanning direction within an effective diameter of the second lens, the amount of asphericity of the second surface being defined as a difference between a SAG amount of a spherical surface having a curvature corresponding to that of the second surface at an optical reference axis thereof and tangential to the second surface at the optical reference axis and a SAG amount of the second surface; and f is a focal length of said imaging optical system in the main scanning direction.

With this configuration, sensitivity of the adjustment of the at least one lens becomes neither excessively low nor excessively high.

Optionally, the imaging optical system may have a scanning lens group being placed adjacent to the deflector, and a compensation lens provided on the side of the surfaces to be scanned with respect to the scanning lens group, the compensation lens compensating for curvature of field.

In this case, the at least one lens is a compensation lens.

Alternatively, the imaging optical system may have a scanning lens group that functions as a scanning lens, all of the plurality of laser beams passing through the scanning lens group.

Optionally, the imaging optical system may have a compensation lens provided for each of the plurality of laser beams, the compensation lens compensating for curvature of field. In this configuration, the scanning lens group is placed adjacent to the deflector, and the at least one lens is a compensation lens provided for each of the plurality of laser beams.

Alternatively, the imaging optical system may have a scanning lens provided for each of the plurality of laser beams, the scanning lens being placed adjacent to the deflector, and a compensation lens provided for each of the plurality of laser beams, the compensation lens compensating for curvature of field.

In this configuration, the at least one lens is a compensation lens provided for each of the plurality of laser beams.

It should be noted that the above-described scanning optical system may be employed in various devices such as a laser beam printer.

BRIEF DESCRIPTION OF THE ACCOMPANYING DRAWINGS

FIG. 3 is a plan view of a compensation lens viewed along a line parallel with an auxiliary scanning direction;

FIG. 4 is a cross sectional view of the compensation lens along a line B—B in FIG. 3;

FIG. 7 is a graph showing an fθ error of the first example, where the compensation lens is shifted to the positive side in the main scanning direction by 1.0 mm;

FIG. 8 is a graph showing an fθ error of the first example, where the compensation lens is turned to the positive side by 1.0° in the main scanning plane;

FIG. 11 is a graph showing an fθ error of the second example, where a compensation lens is shifted to the positive side in the main scanning direction by 1.0 mm;

FIG. 12 is a graph showing an fθ error of the second example, where the compensation lens is turned to the positive side by 1.0° in the main scanning plane;

FIG. 18 is a graph showing an fθ error, where the compensation lens 52m (52c) is shifted to the positive side in the main scanning direction by 1.0 mm;

FIG. 19 is a graph showing an fθ error, where the compensation lens 52m (52c) is turned to the positive side in the main scanning plane by 1.0°;

FIG. 20A is a graph showing an fθ error characteristic with regard to the compensation lenses 52y and 52b according to the example of the second embodiment;

FIG. 20B is a graph showing a curvature of field with regard to the compensation lenses 52y and 52b according to the example of the second embodiment;

FIG. 21 is a graph showing an fθ error, where the compensation lens 52y (52b) is shifted to the positive side in the main scanning direction by 1.0 mm; and FIG. 22 is a graph showing an fθ error, where the compensation lens 52y (52b) is turned to the positive side in the main scanning plane by 1.0°.

DETAILED DESCRIPTION OF THE EMBODIMENTS

Hereinafter, embodiments according to the invention will be described in detail with reference to the accompanying drawings.

First Embodiment

Figure 1:
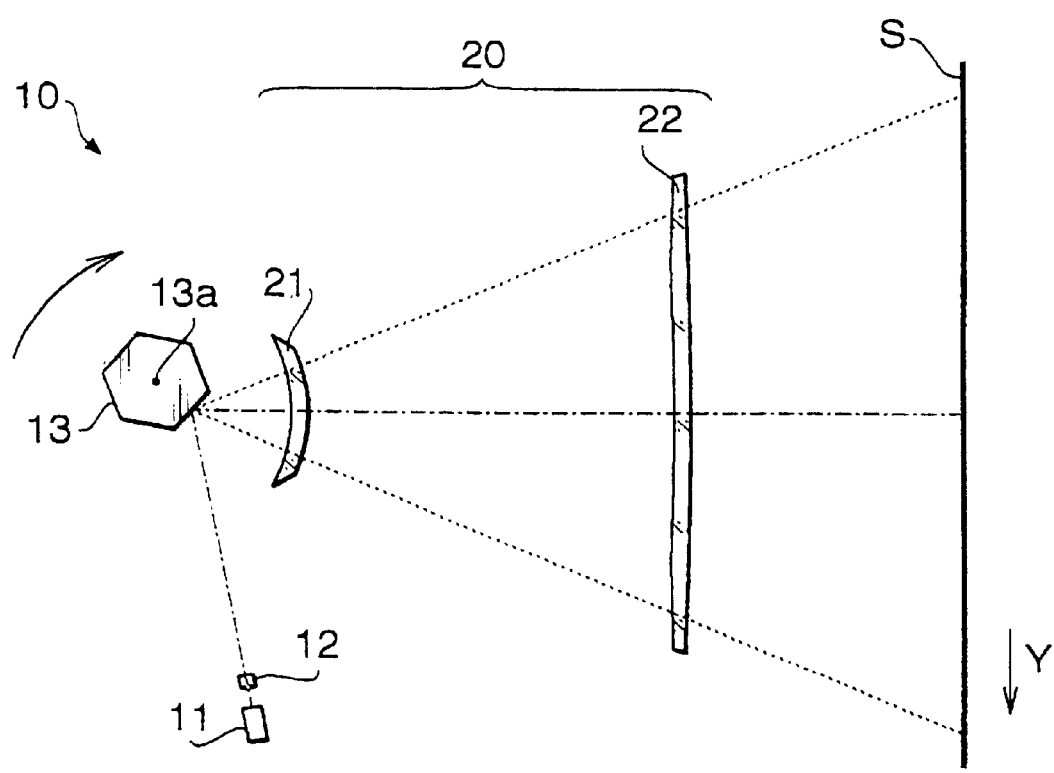
FIG. 1 is a developed view of a scanning optical system employed in a scanning optical unit according to a first embodiment.

FIG. 1 is a developed view of a scanning optical system 10 employed in a scanning optical unit according to a first embodiment of the invention. It should be noted that the scanning optical unit includes four sets of optical elements which constitute the scanning optical system 10 respectively corresponding to four color components. However, in FIG. 1, only elements relating to one of the color components are shown.

As shown in FIG. 1, the scanning optical system 10 is provided with a light source 11 which emits a collimated laser beam, a cylindrical lens 12, a polygonal mirror 13 which deflects the laser beam emitted from the light source 11, and an fθ lens 20 which functions as an imaging optical system.

A collimated laser beam emitted by the light source 11 and passed through the cylindrical lens 12 is deflected by each reflection surface of the polygonal mirror 13 rotating about its rotational axis 13a at a constant angular speed. The fθ lens 20 converges the deflected laser beam onto a surface S to be scanned to form a beam spot scanning on the surface S in a main scanning direction at a constant speed.

The laser beam passed through the cylindrical lens 12 is incident on the reflection surface of the polygonal mirror 13 as a laser beam collimated in the main scanning direction. In an auxiliary scanning direction perpendicular to the main scanning direction, the laser beam passed through the cylindrical lens 12 is converged on a plane closely adjacent to the reflection surface of the polygonal mirror 13, enters the fθ lens 20 as a divergent beam, and then is converged again on the surface S by the fθ lens 20.

That is, the reflection surface of the polygonal mirror 13 and the surface S are conjugate with respect to each other. Therefore, the beam spot formed on the surface S always moves along the same scanning line (within which the beam spot scans as the laser beam is deflected by the polygonal mirror 13 within a predetermined angular range) regardless of a facet error of the polygonal mirror 13.

As shown in FIG. 1, the fθ lens 20 includes a scanning lens 21 which is the polygonal mirror 13 side lens element of the fθ lens 20, and a compensation lens 22 which is the surface S side lens element of the fθ lens 20. The scanning lens 21 has positive power mainly in the main scanning direction. The compensation lens 22 has positive power mainly in the auxiliary scanning direction, and has the function of compensating for aberrations such as, curvature of field, errors of fθ characteristics, and the like.

It should be noted that lens surfaces of the compensation lens 22 may be formed as asymmetrical surfaces. That is, each lens surface of the compensation lens 22 may be formed as a surface which does not have an axis of symmetry. The configuration of such type of the compensation lens is described in detail later.

An optical axis of such type of the compensation lens cannot be defined. Therefore, an axis passing through an origin point of the coordinate system which is used to define the shape of a lens surface by a mathematical expression is defined as an optical reference axis. The optical reference axis of a lens whose lens surface is not rotationally symmetrical is conceptually similar to the optical axis of a lens which is rotationally symmetrical. The optical reference axis of a lens which is rotationally symmetrical coincides with an optical axis thereof. In this specification the term "optical axis" will be only used for a lens which is rotationally symmetrical.

The scanning optical unit according to the first embodiment includes four sets of elements constituting the scanning optical system 10 respectively corresponding to four photoconductive drums for the yellow, magenta, cyan, and black components. This configuration of the scanning optical unit enables to form latent images respectively corresponding to the four color components on the photoconductive drums simultaneously. In particular, the scanning optical unit according to the first embodiment is employed in a color laser printer which is capable of forming a color image on a sheet at high speeds by sequentially transferring toner images for the yellow, magenta, cyan, and black components to the sheet.

Figure 2:
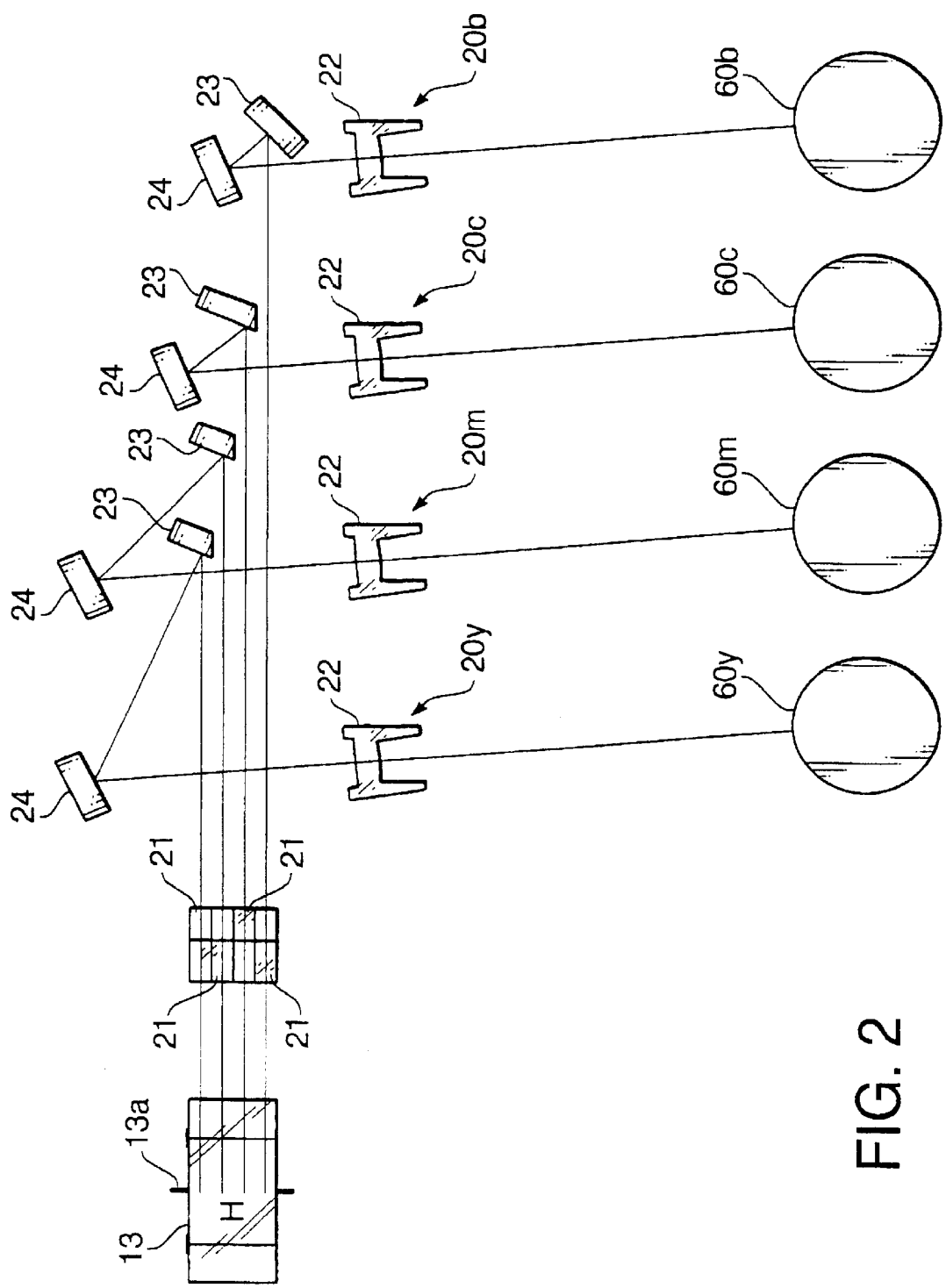
FIG. 2 is a side view of the scanning optical unit according to the first embodiment.

FIG. 2 is a side view of the scanning optical unit according to the first embodiment viewed from a line parallel with the main scanning direction. In the optical scanning unit shown in FIG. 2, four scanning optical systems are provided for the photoconductive drums 60y, 60m, 60c, and 60b for the yellow, magenta, cyan and black components, respectively. Four laser beams are deflected simultaneously by the polygonal mirror 13, and enter fθ lenses 20y, 20m, 20c and 20b, respectively.

It should be noted that, as shown in FIG. 2, four laser beams deflected by the polygonal mirror 13 are bent by respective mirrors 23 and 24 so that the color laser printer employing the scanning optical unit according to the first embodiment is downsized.

With this configuration, four photoconductive drums 60y, 60m, 60c and 60b can be scanned simultaneously while one deflecting operation in which the beam spot scans along the scanning line one time is performed by one of the reflection surfaces of the polygonal mirror 13.

The configuration of the scanning optical unit shown in FIG. 2 will be described in detail. Four laser beams incident on the polygonal mirror 13 are emitted by four light sources 11 (FIG. 1), which are evenly spaced at predetermined intervals in a direction parallel with the rotational axis 13a of the polygonal mirror 13 (i.e., a vertical direction in FIG. 2), and which are arranged so that they are parallel with each other. The four laser beams emitted from the four light sources 11 pass through four cylindrical lenses 12 (FIG. 1), and are incident on the reflection surface of the polygonal mirror 13 being parallel with each other.

The scanning lenses 21 are provided for the fθ lenses 20y, 20m, 20c and 20b, respectively. The width of each of the scanning lenses 21 in the vertical direction in FIG. 2 is equal to the predetermined interval of the four laser beams incident on the polygonal mirror 13. Further, the scanning lenses 21 are stacked in the vertical direction with their optical axes being parallel with each other.

Optical reference axes of the compensation lenses 22 respectively provided in the fθ lenses 20y, 20m, 20c, and 20b are parallel to each other.

On each optical path between each-scanning lens 21 and its corresponding compensation lens 22, mirrors 23 and 24 are arranged to bent the optical path emitted from the scanning lens 21 towards the compensation lens 22.

Since the laser beams entering to the fθ lenses 20y, 20m, 20c, and 20b have the same wavelength, optical characteristics of the fθ lenses should be the same. Therefore, the mirrors 23 and 24 are arranged such that the length of the optical path between the scanning lens 21 and the compensation lens 22 for each of the fθ lenses 20y, 20m, 20c and 20b becomes equal to each other.

The photoconductive drums 60y, 60m, 60c, and 60b have the same cylindrical shape, and are placed at the same distance from their respective compensation lenses 22. The photoconductive drums 60y, 60m, 60c, and 60b are attached to a housing of the color laser printer such that central axes thereof are parallel to the main scanning direction, with the photoconductive drums being rotatable about their central axes, respectively.

The Optical reference axis of each compensation lens 22 intersects the photoconductive surface of the photoconductive drum at a center of the scanning line at an angle of approximately 90°.

In the color laser printer in which the scanning optical unit shown in FIG. 2 is employed, each photoconductive drum is rotated about its rotational axis at a predetermined angular speed while the laser beam repeatedly scans on the photoconductive drum in the main scanning direction, with the laser beam being modulated (i.e., turned to ON or OFF) according to image data. Thus, two dimensional latent images, formed by a plurality of scanning lines, can be formed on the photoconductive surfaces to be scanned, respectively.

Further, in the color laser printer, toner is electrostatically adhered on the latent images formed on the photoconductive drums 60y, 60m, 60c, and 60b to form toner images. Then, the toner images (i.e., the developed images) are transferred, in an overlaid fashion, onto the same sheet to form a color image. The sheet is carried such that toner images formed on the respective photoconductive drums are transferred to the same position on the sheet.

In the optical scanning unit shown in FIG. 2 provided in the color laser printer, each of the compensation lenses 22 is supported in the housing, being movable along a line parallel with the main scanning direction and being rotatable in a main scanning plane which includes the optical reference axis of the compensation lens 22 and is parallel with the main scanning direction.

A mechanism for supporting the compensation lens 22 will be described in detail.

FIGS. 3 and 4 show the compensation lens 22 supported by support members. FIG. 3 is a plan view of the compensation lens 20 viewed along a line parallel with the auxiliary scanning direction. FIG. 4 is a cross sectional view of the compensation lens 22 along a line B—B in FIG. 3.

As shown in FIGS. 3 and 4, the compensation lens 22 has the shape of a rectangular solid with perimeters of a light incident surface 22a and a photoconductive drum side surface 22b being surrounded with four side walls. The cross section of the compensation lens 22 when it is cut by a plane parallel with the auxiliary scanning direction is nearly identical shape with letter "H" (see FIG. 2).

As shown in FIGS. 3 and 4, the compensation lens 22 is attached to the housing of the color laser printer being supported by a support members 1 and 2 which are formed integrally with the housing at both of the ends thereof.

As shown in FIGS. 3 and 4, each of the support members 1 and 2 has the shape of a box without an upper wall and one side wall, and whose cross section takes the concave form. The support members 1 and 2 are formed integrally with the housing, with the underside of each of the support members 1 and 2 touching a flat surface P of the housing (FIG. 4).

An inside surface 1g of the support member 1 and an inside surface 2g of the support member 2 are facing toward each other with a distance between the inside surfaces 1g and 2g being slightly longer than the length of the longer side of the compensation lens 22 (FIG. 3).

As shown in FIG. 3, a coil spring 1b is pressed against the inside surface 1g by the compensation lens 22, and a screw 2b is screwed in a side wall 2a to press an end surface 22d of the compensation lens 22. In addition, coil springs 1c and 2c are pressed against an inside surface 1f of the support member 1 and an inside surface 2f of the support member 2, respectively, by the compensation lens 22. Further, screws 1d and 2d are screwed in a side wall 1e of the support member 1 and a side wall 2e of the support member 2, respectively, to press the compensation lens 22.

Therefore, the compensation lens 22 is supported by the support members 1 and 2 with the coil spring 1b being pressed against the inside surface 1g of the support member 1 by an end face 22c of the compensation lens 22 and the other end face 22d being pressed by a tip of the screw 2b. Accordingly, positioning of the compensation lens 22 in the longer side direction thereof can be achieved through the use of the screw 2b.

In addition, the screw 1d and 2d are respectively pressed against surfaces 22e and 22f of the end portions of the compensation lens 22, and the coil springs 1c and 2c are pressed between surface is 22g and 22h of the end portions of the compensation lens 22 and the inside surfaces 1f and 2f, respectively. Thus, positioning of the compensation lens 22 in the shorter side direction thereof can be achieved through the use of the screws 1d and 2d.

With such a mechanism, the compensation lens 22 moves along the main scanning direction by screwing the screw 2b in. When the screw 2b is screwed in, the optical reference axis Ax' of the lens surface 22a and lens surface 22b can be moved along a line parallel with the main scanning direction. In this case, the amount of movement of the compensation lens 22 in the main scanning direction is proportional to the amount of revolutions of the screw 2b.

In addition, when the screw 1d of the support member 1 or the screw 2d of the support member 2 is screwed in, the compensation lens 22 can be rotated in a clockwise direction or a counterclockwise direction in the main scanning plane. In this case, the compensation lens 22 is rotated responsive to the amount of revolutions of the screw 1d or the screw 2d. Therefore, the optical reference axis Ax' of the compensation lens 22 can be inclined with respect to the optical axis Ax of the scanning lens 21 and can be also paralleled with respect to the optical axis Ax of the scanning lens 21.

With above-mentioned configuration, even though the beam spot which should be formed at a center of the scanning line is not actually formed at the center of the scanning line due to, for example, a positional error of each of the fθ lenses 20y, 20m, 20c, and 20b, a position of the beam spot can be adjusted to be formed at the center of the scanning line.

Therefore, it is possible to cancel the color drift appears at central portions of the scanning lines.

Adjusting steps of the position of the beam spot which should be formed at the center of the scanning line will be described in detail.

At first, a deflection angle, formed between a beam incident on the polygonal mirror 13 and a beam reflected by the polygonal mirror 13, at which the beam spot is theoretically formed at the center of the scanning line is calculated. Next, the polygonal mirror 13 is turned so that one of the reflection surfaces faces in a direction that makes the laser beam deflect at the calculated deflection angle, by using a jig which is capable of turning the reflection surface of the polygonal mirror 13 to any direction. Since such a jig is generally know, detailed description thereof will not be described.

Then, the laser beam is emitted from the light source 11. The laser beam emitted by the light source 11 is deflected by the polygonal mirror 13 and is directed to the surface S to be scanned.

Next, a drift of the beam spot formed on the surface S from the center of the scanning line is measured. The amount of displacement (the amount of shift and/or the amount of rotation) of the compensation lens 22 to direct the laser beam to the center of the scanning line can be determined according to the measured drift. Based on the determined amount of displacement, positioning of the compensation lens 22 is performed by adjusting positions of the compensation lens 22 through the use of the screws 2b, 1d and 2d.

Above mentioned positioning of the compensation lens is performed for each of the color components. Thus, for each of the color components, the beam spot which should be formed at the center of the scanning line is actually formed at the center of the scanning line.

The scanning optical system 10 satisfies a condition:

$$0.05 < |f/fL| < 0.5 \qquad (1)$$

where, f is a focal length of the fθ lens 20 in the main scanning direction; and fL is a focal length of the compensation lens 22 in the main scanning direction.

The condition (1) regulates a relationship between a power of an imaging optical system of the scanning optical system and a power of the compensation lens 22 in the main scanning direction. If the ratio |f/fL| is smaller than the lower limit of condition (1), sensitivity of the above mentioned adjustment is excessively weakened, i.e., a ratio of the shift of the beam spot to the displacement of the compensation lens 22 decreases significantly. In this case, the above mentioned adjustment of the compensation lens 22 becomes difficult.

If the ratio |f/fL| is greater than the upper limit of condition (1), sensitivity of the above mentioned adjustment is intensified. Also, in this case, the above mentioned adjustment of the compensation lens 22 becomes difficult. Particularly, if the compensation lens 22 is made of plastic, performance of the scanning optical system 10 is further deteriorated due to temperature variations.

Further, the scanning optical system 10 satisfies a condition:

$$0.01 < |[\Delta X1(max) + \Delta X2(max)]/f| < 0.1 \qquad (2)$$

where, where, $\Delta X1(max)$ represents an amount of asphericity of the lens surface 22a at an outermost position on the lens surface 22a in the main scanning direction within an effective diameter of the lens surface 22a, the amount of asphericity of the lens surface 22a being defined as a difference between a SAG amount of a spherical surface having a radius of curvature corresponding to that of the lens surface 22a on the optical reference axis and a SAG amount of the lens surface 22a;

where, $\Delta X2(max)$ represents an amount of asphericity of the lens surface 22b at an outermost position on the lens surface 22b in the main scanning direction within an effective diameter of the lens surface 22b, the amount of asphericity of the lens surface 22b being defined as a difference between a SAG amount of a spherical surface having a radius of curvature corresponding to that of the lens surface 22b on the optical reference axis and a SAG amount of the lens surface 22b; and f is a total focal length of the fθ lens 20 in the main scanning direction.

A SAG amount is a distance between a point on a surface and a plane tangential to the surface at an optical reference axis thereof.

The condition (2) regulates a relationship between a total power of the imaging optical system of the scanning optical system 10 and the amount of asphericity of the compensation lens 22.

If the ratio |[ΔX1(max)+ΔX2(max)]/f| is smaller than the lower limit of condition (2), sensitivity of the above mentioned adjustment is excessively weakened. In this case, the above mentioned adjustment of the compensation lens 22 becomes difficult.

If the ratio |[ΔX1(max)+ΔX2(max)]/f| is greater than the upper limit of the condition (2), sensitivity of the above mentioned adjustment is excessively intensified. In this case, the above mentioned adjustment of the compensation lens 22 also becomes difficult.

Hereinafter, two concrete examples of the scanning optical system 10 according to the first embodiment will be described.

FIRST EXAMPLE

Figure 5:
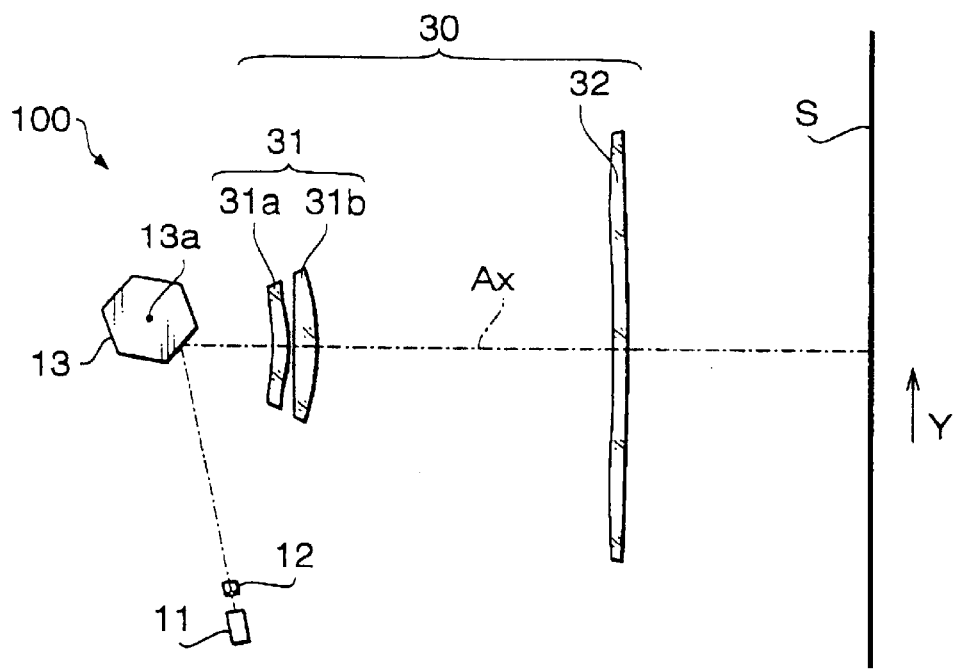
FIG. 5 is a developed view of a scanning optical system according to a first example of the first embodiment.

FIG. 5 is a developed view of the scanning optical system 100 according to the first example. In FIG. 5, to elements which are similar to those in FIG. 1, the same reference numbers are assigned, and the detailed description thereof will not be repeated.

As shown in FIG. 5, an fθ lens 30 includes a scanning lens 31 having a first lens 31a and a second lens 31b, and a compensation lens 32. Both sides of the first lens 31a are rotationally symmetrical aspherical surfaces. The light incident side of the second lens 31b is a planar surface, and the surface S side of the second lens 31b is a spherical surface.

The light incident side of the compensation lens 32 is anamorphic aspherical surface, and the surface S side of the compensation lens 32 is spherical surface.

TABLE 1 indicates a numerical structure of the scanning optical system 100 according to the first example as to paraxial rays from the light incident side of the cylindrical lens 12 to the surface S. In TABLE 1, surfaces #1 and #2 represents surfaces of the cylindrical lens 12, surface #3 is the reflection surface of the polygonal mirror 13, surfaces #4 and #5 represent the first lens 31a of the scanning lens 31, surfaces #6 and #7 represent the second lens 31b, surfaces #8 and #9 represent the compensation lens 32.

In TABLE 1, R denotes a radius (unit: mm) of curvature in the main scanning direction, Rz denotes a radius (unit: mm) of curvature in the auxiliary scanning direction. If a surface is rotationally symmetrical, no value is indicated for Rz. Further, d denotes a distance between adjacent surfaces on the optical axis Ax, n denotes a refractive index at a design wavelength of 780 nm, and h(max) represents an effective diameter. A focal length f of the fθ lens 30 in the main scanning direction is 200 mm, and a scanning width is 216 mm.

TABLE 1

| surface | R | Rz | d | n | h(max) |
|---|---|---|---|---|---|
| #1 | ∞ | 51.00 | 4.00 | 1.51072 | — |
| #2 | ∞ | — | 97.00 | — | — |
| #3 | ∞ | — | 33.00 | — | — |
| #4 | −70.50 | — | 5.00 | 1.48617 | 22.08 |
| #5 | −64.10 | — | 2.00 | — | 23.71 |
| #6 | ∞ | — | 8.00 | 1.51072 | 26.34 |
| #7 | −121.40 | — | 108.00 | — | 28.00 |
| #8 | −880.00 | 29.23 | 5.00 | 1.48617 | 74.37 |
| #9 | −1930.10 | — | 89.00 | — | 75.43 |

The rotationally symmetrical aspherical surface is expressed by following equation.

$$X(h) = \frac{Ch^2}{1 + \sqrt{1 - (1+\kappa)C^2 h^2}} + A_4 h^4 + A_6 h^6 + A_8 h^8 \quad (3)$$

In the above equation, X(h) represents a SAG amount which is a distance between a point on the aspherical surface at a height of h from the optical axis and a plane tangential to the aspherical surface at the optical axis. C represents a curvature (1/r) on the optical axis. $\kappa$ represents a conical coefficient, and $A_4$, $A_6$ and $A_8$ are aspherical coefficients of 4th, 6th and 8th orders, respectively. The radii of curvatures of the rotationally symmetrical aspherical surfaces in TABLE 1 are those on the optical axis. Conical coefficients and aspherical coefficients for the surfaces #4 and #5 are indicated in TABLE 2. The aspherical coefficients not shown in TABLE 2 are zero.

TABLE 2

| surface | $\kappa$ | $A_4$ | $A_6$ |
|---|---|---|---|
| #4 | 0.00 | $7.140 \times 10^{-6}$ | $1.190 \times 10^{-11}$ |
| #5 | 0.00 | $5.980 \times 10^{-6}$ | $7.130 \times 10^{-10}$ |

The anamorphic aspherical surface is defined by the following equation.

$$X(Y) = \frac{CY^2}{1 + \sqrt{1 - (1+\kappa)C^2 Y^2}} + AM_4 Y^4 + AM_6 Y^6 + \ldots \quad (4)$$

$$\frac{1}{R_z(Y)} = \frac{1}{R_z 0} + AS_1 Y^1 + AS_2 Y^2 + AS_3 Y^3 + AS_4 Y^4 + AS_5 Y^5 + \ldots \quad (5)$$

where, X(Y) is a SAG amount which is obtained as a function of a coordinate Y. The coordinate Y represents a distance from the optical reference axis to a point on a curved line extending along the anamorphic aspherical surface in the main scanning direction and passing the optical reference axis thereof. The SAG amount X(Y) represents a distance between the point on the anamorphic aspherical surface and a plane tangential to the anamorphic aspherical surface at the optical reference axis. Further, Rz(Y) represents a radius of an arc extending in the auxiliary scanning direction, the arc intersecting the curved line at the point whose coordinate is Y. C represents a curvature (1/r) of the anamorphic aspherical surface on the optical reference axis. $\kappa$ represents a conical coefficient, and $AM_4$ and $AM_6$ are aspherical coefficients of 4th and 6th orders, respectively. $AS_1$, $AS_2$, $AS_3$, $AS_4$, and $AS_5$ are aspherical coefficients for determining the radius in the auxiliary scanning direction.

Values of the coefficients for the surface #8 are indicated in TABLE 3. Aspherical coefficients not shown in the TABLE 3 are 0.00.

TABLE 3

| $\kappa = 0.000$ | |
|---|---|
| $AM_4 = 1.300 \times 10^{-7}$ | $AS_1 = -1.490 \times 10^{-6}$ |
| $AM_6 = -1.140 \times 10^{-11}$ | $AS_2 = -1.040 \times 10^{-7}$ |
| $AM_8 = 6.460 \times 10^{-16}$ | $AS_4 = 3.040 \times 10^{-11}$ |

Figure 6A:
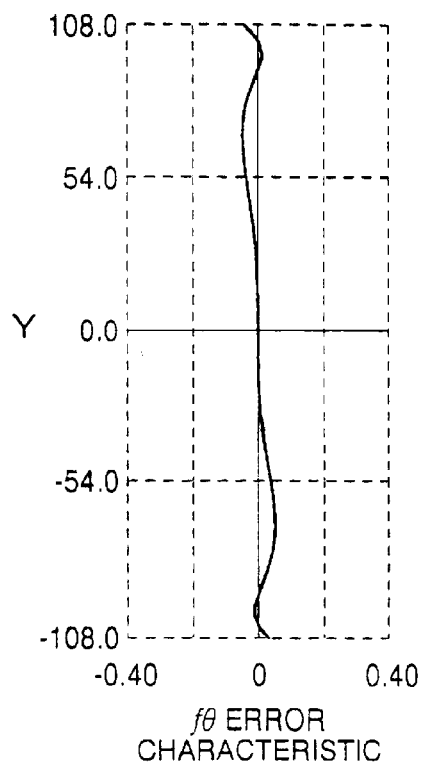
FIG. 6A is a graph showing an fθ error characteristic of the scanning optical system according to the first example.
Figure 6B:
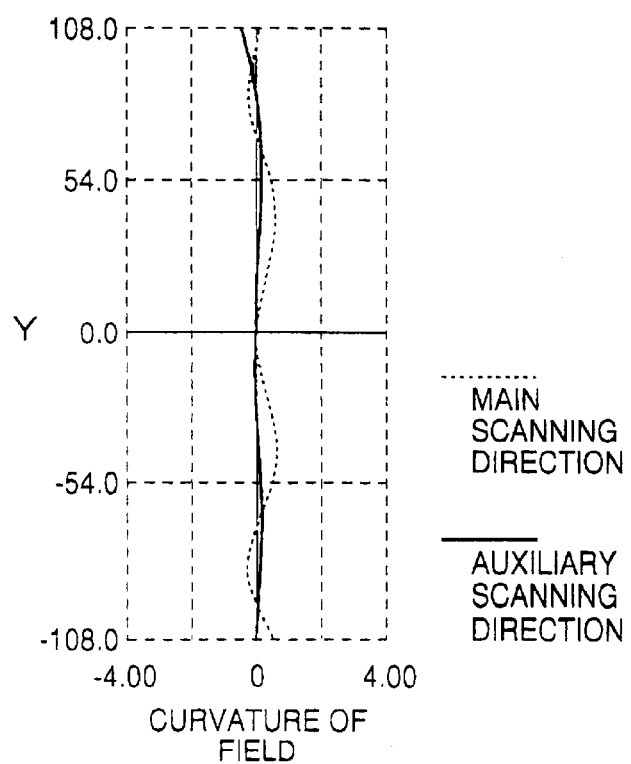
FIG. 6B is a graph showing a curvature of field of the scanning optical system according to the first example.

FIG. 6A is a graph showing an fθ error characteristic (i.e., displacement of a beam spot in the main scanning direction with respect to a designed position) of the scanning optical system 100 according to the first example. FIG. 6B is a graph showing a curvature of field of the scanning optical system 100 according to the first example. Each graph represents a characteristic when the scanning optical system 100 is assembled as it is designed. In FIG. 6B, a broken line shows the characteristic in the main scanning direction, and a solid line shows the characteristic in the auxiliary scanning direction. In each graph, the longitudinal axis represents an image height (unit: mm), and the horizontal axis represents an amount of aberration (unit: mm). In each graph, a positive direction of the axis Y corresponds to an upward direction in FIG. 5. As shown in FIGS. 6A and 6B, each amount of aberration in the scanning optical system 100 is extremely small.

Sensitivity of the above mentioned adjustment is obtained in the following steps.

FIG. 7 is a graph showing an fθ error, where the compensation lens 32 is shifted to the positive side in the main scanning direction by 1.0 mm through the use of the screw 2b with respect to the position of the compensation lens 32 corresponding to the condition shown in FIGS. 6A and 6B. In this case, as can be seen by making a comparison between FIGS. 6A and 7A, the beam spot which should be formed at the center of the scanning line (i.e., the beam spot of image height y=0) drifts by approximately 0.03 mm to the negative side in the main scanning direction.

FIG. 8 is a graph showing an fθ error, where the compensation lens 32 is turned to the positive side by 1.0° in the main scanning plane (i.e., tuned counterclockwise in FIG. 5) through the use of the screws 1d and 2d. In this case, as can be seen by making a comparison between FIG. 6A and FIG. 8, the beam spot which should be formed at the center of the scanning line (i.e., the beam spot of image height y=0) drifts by approximately 0.06 mm to the negative side in the main scanning direction.

Since sensitivity of the adjustment is obtained in such steps, if the shift amount of the beam spot is measured, then the displacement of the compensation lens 32 to perform the above mentioned adjustment can be determined.

Regarding conditions (1) and (2), the first example has the following values:

$f$=200

$fL$=−3332.13

$|f/fL|$=0.060

$\Delta X1(\max)$=2.653

$\Delta X2(\max)$=0.000

$|[\Delta X1(\max)+\Delta X2(\max)]/f|$=0.013

Since the fθ lens 30 satisfies both of the conditions (1) and (2), sensitivity of the adjustment of the compensation lens 32 becomes neither excessively low nor excessively high.

SECOND EXAMPLE

Figure 9:
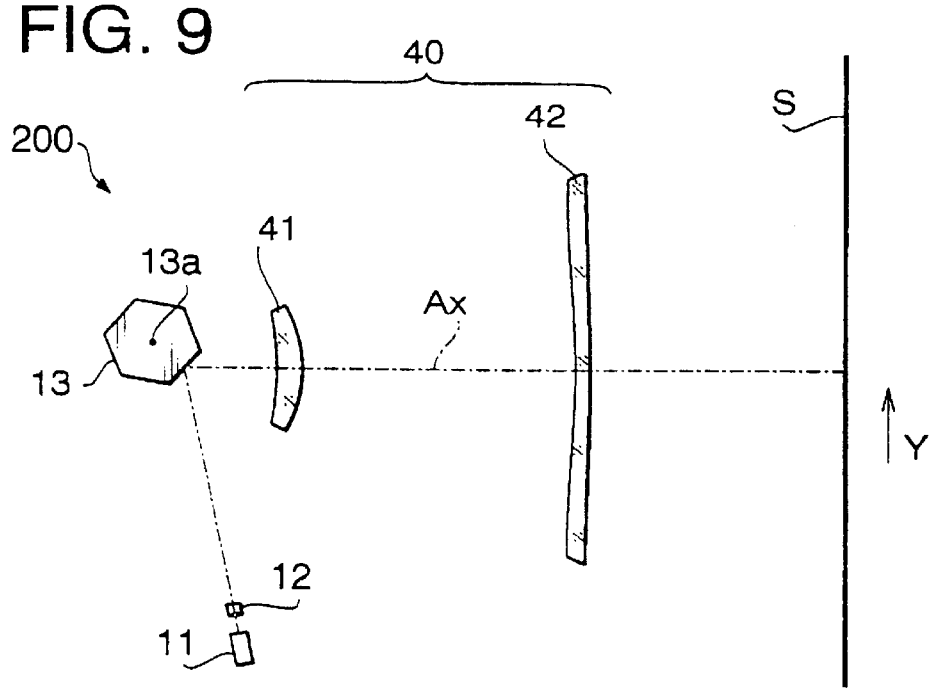
FIG. 9 is a developed view of a scanning optical system according to a second example of the first embodiment.

FIG. 9 is a developed view of a scanning optical system 200 according to the second example. In FIG. 9, to elements which are similar to those in FIG. 1, the same reference numbers are assigned, and the detailed description thereof will not be repeated.

As shown in FIG. 9, a scanning lens 41 of a fθ lens 40 includes a single lens. Both sides of the scanning lens 41 are formed as rotationally aspherical surfaces. A light incident side of a compensation lens 42 is an anamorphic aspherical surface, and the surface S side of the compensation lens 42 is a rotationally aspherical surface.

TABLE 4 indicates a numerical structure of the scanning optical system 200 according to the second example as to paraxial rays from a light incident side of the cylindrical surface 12 to the surface S. A focal length f of the fθ lens 40 in the main scanning direction is 200 mm, and a scanning width is 216 mm.

TABLE 4

| surface | R | Rz | d | n | h(max) |
|---|---|---|---|---|---|
| #1 | ∞ | 51.00 | 4.00 | 1.51072 | — |
| #2 | ∞ | — | 97.00 | — | — |
| #3 | ∞ | — | 33.00 | — | — |
| #4 | −95.90 | — | 9.00 | 1.48617 | 22.01 |
| #5 | −47.17 | — | 100.00 | — | 24.23 |
| #6 | −311.00 | 29.16 | 5.00 | 1.48617 | 67.82 |
| #7 | −1177.80 | — | 91.80 | — | 69.67 |

As described above, both sides of the scanning lens 41 (surfaces #4 and #5) and the surface S side of the compensation lens 42 (surface #7) are rotationally aspherical surfaces. Conical coefficients and aspherical coefficients for the surfaces #4, #5 and #7 are indicated in TABLE 5. The aspherical coefficients not shown in TABLE 5 are zero.

TABLE 5

| surface | κ | $A_4$ | $A_6$ |
|---|---|---|---|
| #4 | 0.00 | $2.660 \times 10^{-6}$ | $-1.840 \times 10^{-10}$ |
| #5 | 0.00 | $2.160 \times 10^{-6}$ | $1.110 \times 10^{-10}$ |
| #7 | 0.00 | $2.850 \times 10^{-8}$ | 0.000 |

Values of the coefficients for the surface #6 when the surface #6 is defined by the equations (4) and (5) are indicated in TABLE 6. Aspherical coefficients not shown in the TABLE 6 are zero.

TABLE 6

| κ = 0.000 | |
|---|---|
| $AM_4 = 2.500 \times 10^{-7}$ | $AS_1 = -1.970 \times 10^{-6}$ |
| $AM_6 = -1.020 \times 10^{-11}$ | $AS_2 = -9.580 \times 10^{-7}$ |
| $AM_8 = 0.000$ | $AS_4 = -4.200 \times 10^{-13}$ |

Figure 10A:
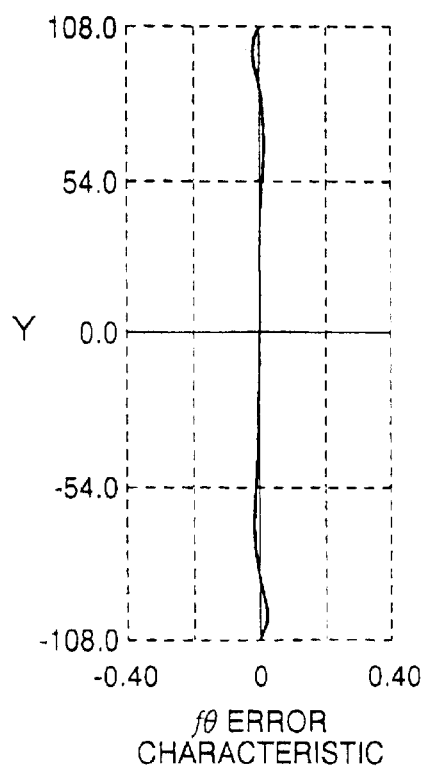
FIG. 10A is a graph showing an fθ error characteristic of the scanning optical system according to the second example.
Figure 10B:
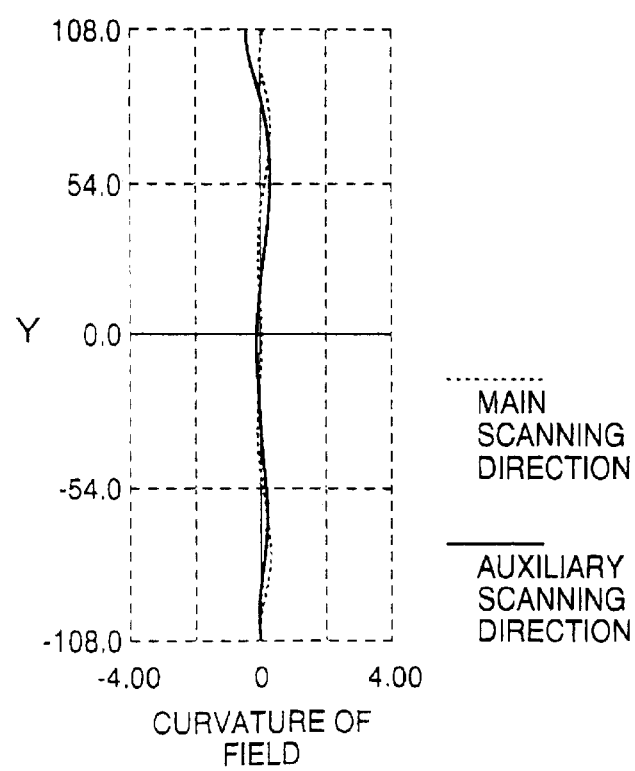
FIG. 10B is a graph showing a curvature of field of the scanning optical system according to the second example.

FIG. 10A is a graph showing an fθ error characteristic (i.e., displacement of a beam spot in the main scanning direction with respect to a designed position) according to the second example. FIG. 10B is a graph showing a curvature of field according to the second example. Each graph represents a characteristic when the scanning optical system 200 is assembled as it is designed. In FIG. 10B, a broken line shows the characteristic in the main scanning direction, and a solid line shows the characteristic in the auxiliary scanning direction. In each graph, the longitudinal axis represents an image height (unit: mm), and the horizontal axis represents an amount of aberration (unit: mm). In each graph, a positive direction of axis Y corresponds to an upward direction in FIG. 9. As shown in FIGS. 10A and 10B, each of the amount of aberration in the scanning optical system 200 is extremely small. That is, the beam spot which should be formed at the center of the scanning line is actually formed at the center of the scanning line.

FIG. 11 is a graph showing an fθ error, where the compensation lens 42 is shifted to the positive side in the main scanning direction by 1.0 mm through the use of the screw 2b with respect to the position of the compensation lens 42 corresponding to the condition shown in FIGS. 10A and 10B. In this case, as can be seen in FIG. 11, the beam spot which should be formed at the center of the scanning line (i.e., the beam spot of image height y=0) drifts by approximately 0.11 mm to the negative side in the main scanning direction.

FIG. 12 is a graph showing an fθ error, where the compensation lens 42 is turned to the positive side by 1.0° in the main scanning plane (i.e., tuned counterclockwise in FIG. 9) through the use of the screws 1d and 2d. In this case, as can be seen in FIG. 12, the beam spot which should be formed at the center of the scanning line (i.e., the beam spot of image height y=0) drifts by approximately 0.06 mm to the negative side in the main scanning direction.

Since sensitivity of the adjustment is obtained in such steps, if the shift amount of the beam spot is measured, then the displacement of the compensation lens 42 to perform the above mentioned adjustment can be determined.

Regarding conditions (1) and (2), the second example has the following values:

$f=200$ $fL=-870.86$ $|f/fL|=0.230$ $\Delta X1(\max)=3.499$ $\Delta X2(\max)=0.672$ $|[\Delta X1(\max)+\Delta X2(\max)]/f|=0.021$ Since the fθ lens 40 satisfies both of the conditions (1) and (2), sensitivity of the adjustment of the compensation lens 42 becomes neither excessively low nor excessively high.

Second Embodiment

Figure 13:
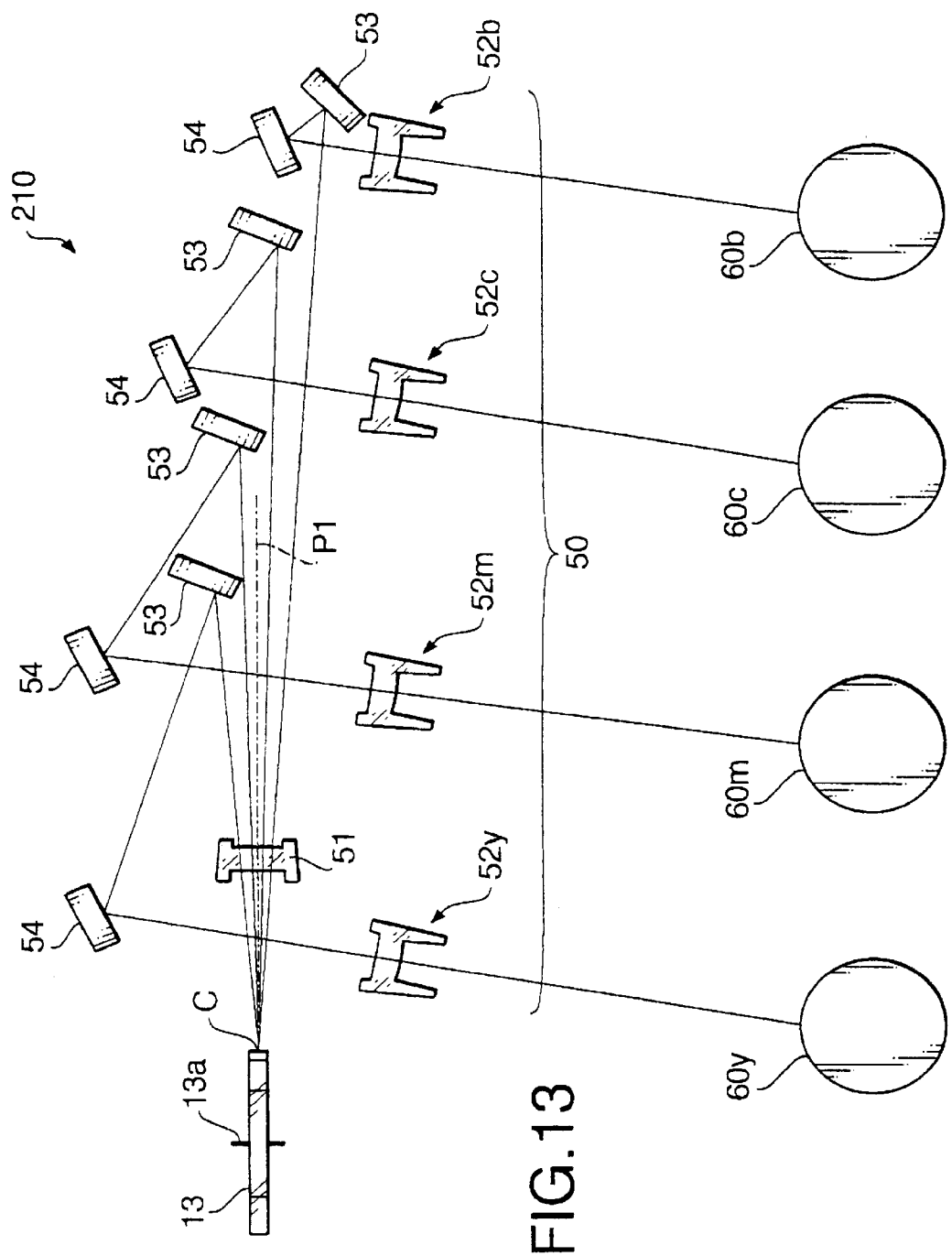
FIG. 13 is a side view of a scanning optical system according to a second embodiment.

FIG. 13 is a side view of the scanning optical system 210 according to a second embodiment. In the second embodiment, to elements which are similar to those of the first embodiment, the same reference numbers are assigned, and the detailed description thereof will not be repeated. As can be seen by making a comparison between the first embodiment (FIG. 2) and the second embodiment (FIG. 13), in the scanning optical system 210 according to the second embodiment, for four laser beams, a single scanning lens 51 is used in place of the scanning lenses 21 shown in FIG. 2.

As shown in FIG. 13, optical paths of the four laser beams between the polygonal mirror 13 and their respective photoconductive drums are bent by mirrors 53 and 54.

In the scanning optical system 210 according to the second embodiment, an fθ lens 50 includes the single scanning lens 51 and four compensation lenses 52y, 52m, 52c and 52b to which four laser beams emerged from the scanning lens 51 enter, respectively. The scanning lens 51 includes a single lens through which all of the four laser beams pass. The four laser beams emitted by the four light sources travel to the polygonal mirror 13 in a plane parallel with the rotational axis 13a of the polygonal mirror 13, and then they intersect at a point C on the optical axis Ax of the scanning lens 51 (see FIG. 14).

In FIG. 13, a plane indicated by dashed line P1 is defined as the main scanning plane. As shown in FIG. 13, between the polygonal mirror 13 and the mirrors 53, each of inner two optical paths is inclined in the opposite direction with respect to the main scanning plane P1, with the magnitude of an angle at which each of the two inner optical paths is inclined in the auxiliary scanning plane with respect to the main scanning plane P1 being the same. Similarly, between the polygonal mirror 13 and the mirrors 53, each of outer two optical paths is inclined in the opposite direction with respect to the main scanning plane P1, with the magnitude of an angle at which each of the two outer optical paths is inclined in the auxiliary scanning plane with respect to main scanning plane P1 being the same. In this case, each of the four laser beams deflected by the polygonal mirror 13 travels toward the scanning lens 51 with a distance from the main scanning plane P1 becoming bigger.

The width in the auxiliary direction of the scanning lens 51 is sufficient for the four laser beams deflected by the polygonal mirror 13 to pass through the scanning lens 51 simultaneously.

In each of the optical paths between the polygonal mirror 13 and their respective compensation lenses 52y, 52m, 52c and 52b, mirrors 53 and 54 which bend the optical path are provided to direct the laser beam to the corresponding compensation lens. In contrast to the first embodiment, each of the laser beams bent by the mirrors 53 and 54 enters the light incident side of the corresponding compensation lens at a position shifted, in the auxiliary scanning direction, from a point at which the optical reference axis of the corresponding compensation lens passes through the light incident side of the corresponding compensation lens.

That is, the compensation lenses 52y, 52m, 52c and 52b are decentered in the auxiliary scanning direction. Each of the compensation lenses 52y, 52m, 52c and 52b is arranged such that a decentering amount thereof gradually increase as a distance between the laser beam passing through the scanning lens 51 and the main scanning plane P1 increases. That is, a decentering amount of the compensation lens 52y (52b) is greater than a decentering amount of the compensation lens 52m (52c). The four laser beams passed through the compensation lenses 52y, 52m, 52c and 52b impinge on the photoconductive drums 60y, 60m, 60c and 60b, respectively.

Similar to the compensation lens 22 described with reference to FIGS. 3 and 4, the outside shape of each of the compensation lenses 52y, 52m, 52c and 52b is a long rectangular solid. In addition, each of the compensation lenses 52y, 52m, 52c and 52b is supported by support members identical to the support members 1 and 2 so that it is shifted in the main scanning direction and is rotated in the main the main scanning plane. Accordingly, even though the beam spot which should be formed at the center of the scanning line is not actually formed at the center of the scanning line due to an error of an installed position of the fθ lens 50, a position of the beam spot can be adjusted to be formed at the center of the scanning line for each of the color components. Steps of positioning of the compensation lenses 52y, 52m, 52c and 52b are similar to that of the compensation lenses 20, and the detailed description thereof will not be repeated.

The scanning optical system 210 according to the second embodiment satisfies the conditions (1) and (2). Therefore, sensitivity of the adjustment of the compensation lenses 52y, 52m, 52c and 52b become neither excessively low nor excessively high.

Hereinafter, a concrete example of the scanning optical system 210 according to the second embodiment will be described.

EXAMPLE

Figure 14:
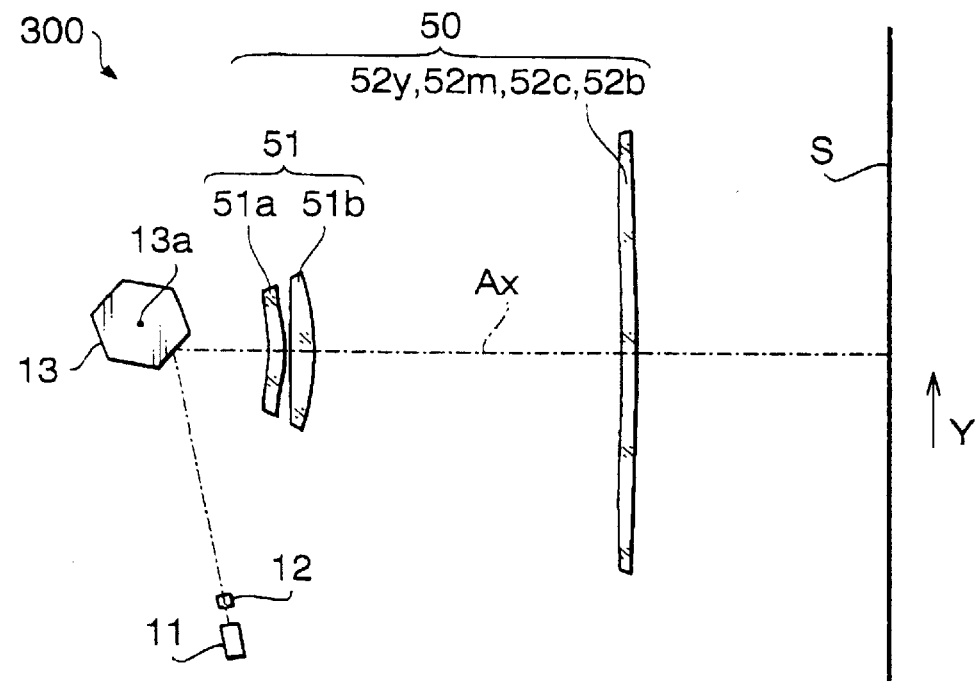
FIG. 14 is a developed view of a scanning optical system of an example of the second embodiment viewed from a line parallel with a rotational axis of a polygonal mirror.
Figure 15:
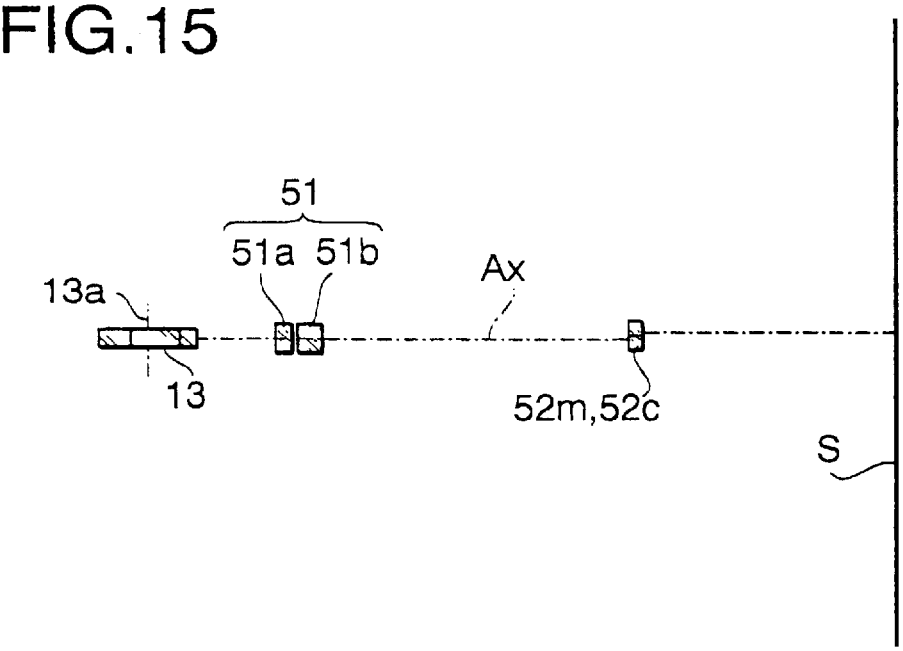
FIG. 15 is a developed-view of the scanning optical system of the example of the second embodiment with regard to compensation lenses 52m and 52c viewed from a line parallel with the main scanning direction.
Figure 16:
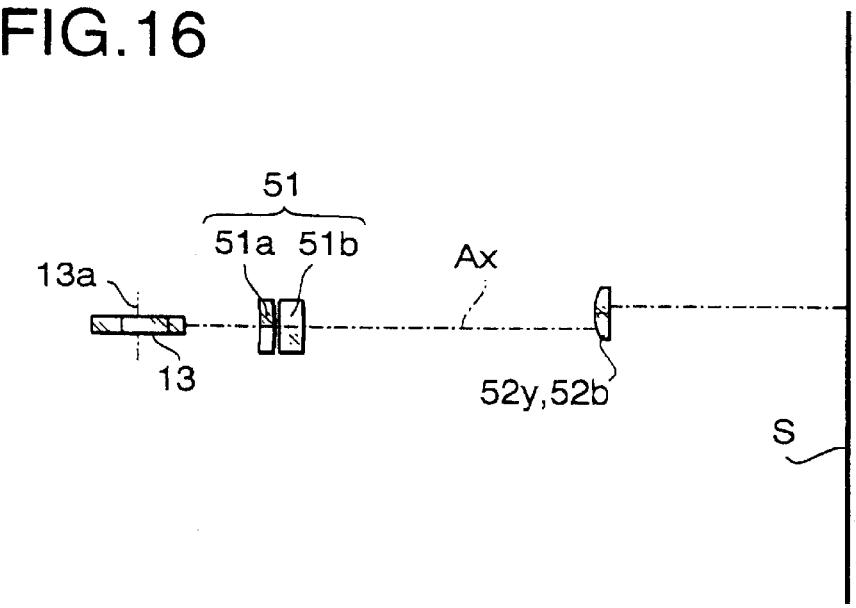
FIG. 16 is a developed view of the scanning optical system of the example of the second embodiment with regard to compensation lenses 52y and 52b viewed from a line parallel with the main scanning direction.

FIGS. 14–16 show a scanning optical system 300 according to an example of the second embodiment.

FIG. 14 is a developed view of the scanning optical system 300 viewed from a line parallel with the rotational axis 13a of the polygonal mirror 13. FIG. 15 is a developed view of the scanning optical system 300 with regard to the compensation lenses 52m and 52c viewed from a line parallel with the main scanning direction. FIG. 16 is a developed view of the scanning optical system 300 with regard to the compensation lenses 52y and 52b viewed from a line parallel with the main scanning direction. In FIGS. 14–16, to elements which are similar to those shown in FIG. 1, the same reference numbers are assigned.

As shown in FIGS. 14–16, the scanning lens 51 according to the example of the second embodiment includes a first scanning lens 51a and a second scanning lens 51b. Both sides of the first scanning lens 51a are formed as rotationally symmetrical aspherical surfaces. A light incident side of the second scanning lens 51b is formed as a plane surface, and the surface S side of the second scanning lens 51b is formed as a spherical surface.

A light incident side of each of the compensation lenses 52y, 52m, 52c and 52b is formed as an aspherical surface which is defined by a two dimensional polynomial expression with regard to the main scanning direction and the auxiliary scanning direction. The surface S side of each of the compensation lenses 52y, 52m, 52c and 52b is formed as a spherical surface. The compensation lenses 52m and 52c, which are placed at positions symmetrical with respect to the main scanning plane P1 when shown by a developed view, have the same shape. Also, compensation lenses 52y and 52b, which are placed at positions symmetrical with respect to the main scanning plane P1 when shown by a developed view, have the same shape.

TABLE 7 indicates a numerical structure of the scanning optical system according to the example of the second embodiment as to paraxial rays from the light incident side of the cylindrical lens 12 to the surface S. Meanings of symbols in TABLE 7 are equal to those shown in TABLE 1. "Symbol(inside)" represents values with regard to the compensation lenses 52m and 52c (hereafter, each of them is referred to as an inner optical system). Also, "symbol (outside)" represents values with regard to the compensation lenses 52y and 52b (hereafter, each of them is referred to as an outer optical system). In TABLE 7, "incident angles (inside/outside)" represent angles (absolute values) at which central axes of laser beams, passing through their respective compensation lenses 52m (52c) and 52y (52b), form with respect to the optical axis Ax of the scanning lens 51 when the laser beams are incident on the polygonal mirror 13.

Further, d denotes a distance between adjacent surfaces on the optical axis Ax of the scanning lens 51 and DECZ denotes a decentering amount (unit: mm) of each of the optical reference axes of the compensation lenses 52y, 52m, 52c and 52b in the auxiliary scanning direction with respect to the optical axis Ax of the scanning lens 51. More specifically, on the surface S to be scanned, the decentering amount corresponds to the amount of shift of the beam spot formed on the surface S with respect to a point at which the optical axis Ax enters to the surface S when the scanning optical system is developed as shown in FIGS. 14–16. A focal length of the fθ lens 50 in the main scanning direction is 200 mm, and a scanning width is 216 mm.

TABLE 7

Incident angle (inside/outside) 1.15°/3.45°

| surface | R | Rz | d | n | DECZ | H(max) |
|---|---|---|---|---|---|---|
| #1 | ∞ | 51.00 | 4.00 | 1.51072 | — | — |
| #2 | ∞ | — | 97.00 | — | — | — |
| #3 | ∞ | — | 33.00 | — | — | — |
| #4 | −70.50 | — | 5.00 | 1.48617 | — | 22.08 |
| #5 | −64.10 | — | 2.00 | — | — | 23.71 |
| #6 | ∞ | — | 8.00 | 1.51072 | — | 26.33 |
| #7 | −121.40 | — | 108.00 | — | — | 28.00 |
| #8 (inside) | −937.00 | — | 5.00 | 1.48617 | 1.40 | 74.92 |
| #9 (inside) | −2233.10 | — | 89.00 | — | 0.00 | 75.38 |
| #8 (outside) | −1035.70 | — | 5.00 | 1.48617 | 6.36 | 74.01 |
| #9 (outside) | −3025.60 | — | 89.00 | — | 0.00 | 75.35 |

Conical coefficients and aspherical coefficients for the surfaces #4 and #5 are indicated in TABLE 8.

TABLE 8

| surface | κ | $A_4$ | $A_6$ |
|---|---|---|---|
| #4 | 0.00 | $7.450 \times 10^{-6}$ | $-4.110 \times 10^{-11}$ |
| #5 | 0.00 | $6.250 \times 10^{-6}$ | $-8.480 \times 10^{-10}$ |

As described above, each light incident side of the compensation lenses 52y, 52m, 52c and 52b (i.e., surface #8(inside/outside)) is defined by the two dimensional polynomial expression. More specifically, a SAG amount of each of the light incident side of the compensation lenses, which is a distance between the point of the light incident surface and a plane tangential to the light incident surface, is defined by a two dimensional polynomial expression whose coordinate axes correspond to the main scanning direction (y axis direction) and the auxiliary scanning direction (z axis direction). In this coordinate system, a point at which the optical reference axis of the compensation lens perpendicularly intersects with the tangential plane is defined as the origin point.

That is, the SAG amount is defined by following expression:

$$X(y, z) = \frac{C(y^2 + z^2)}{1 + \sqrt{1 - (1+\kappa)C^2(y^2 + z^2)}} + \sum\sum B(m, n) Y^m Z^n \quad (6)$$

where, C represents a curvature (1/r) in the main scanning direction at the optical reference axis. κ represents a conical coefficient, and B(m, n) is an aspherical coefficient (m, n; an integer of more than zero).

Values of the aspherical coefficients for the surface #8(inside) and the surface #8(outside) are located in TABLES 9 and 10, respectively. Aspherical coefficients not shown in the TABLES 9 and 10 are zero.

TABLE 9

| m\n | 0 | 1 | 2 | 4 |
|---|---|---|---|---|
| 0 | 0.000 | $-1.020 \times 10^{-2}$ | $1.760 \times 10^{-2}$ | $1.430 \times 10^{-7}$ |
| 2 | 0.000 | $4.660 \times 10^{-7}$ | $-4.960 \times 10^{-7}$ | $1.040 \times 10^{-11}$ |
| 4 | $1.290 \times 10^{-7}$ | $-5.430 \times 10^{-11}$ | $1.130 \times 10^{-11}$ | 0.000 |
| 6 | $-1.120 \times 10^{-11}$ | 0.000 | 0.000 | 0.000 |
| 8 | $6.300 \times 10^{-16}$ | 0.000 | 0.000 | 0.000 |

TABLE 10

| m\n | 0 | 1 | 2 | 4 |
|---|---|---|---|---|
| 0 | 0.000 | $2.290 \times 10^{-2}$ | $1.743 \times 10^{-2}$ | $7.440 \times 10^{-7}$ |
| 2 | 0.000 | $-1.380 \times 10^{-7}$ | $-4.960 \times 10^{-7}$ | $8.915 \times 10^{-11}$ |
| 4 | $1.280 \times 10^{-7}$ | $-1.350 \times 10^{-10}$ | $1.186 \times 10^{-11}$ | 0.000 |
| 6 | $-1.110 \times 10^{-11}$ | 0.000 | 0.000 | 0.000 |
| 8 | $6.300 \times 10^{-16}$ | 0.000 | 0.000 | 0.000 |

As indicated in TABLES 9 and 10, since every aspherical coefficient whose subscript m is an odd number is zero, the surface #8 is symmetrical in the main scanning direction with respect to the origin point. Also, every aspherical coefficient whose subscript n is an odd number is zero except for an aspherical coefficient of n=1. Therefore, the surface #8 is inclined with respect to the tangential plane in the auxiliary direction.

Figure 17A:
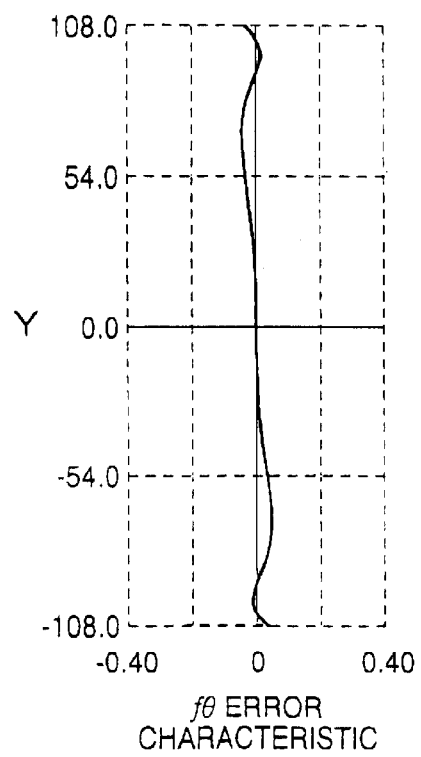
FIG. 17A is a graph showing an fθ error characteristic with regard to the compensation lenses 52m and 52c according to the example of the second embodiment.
Figure 17B:
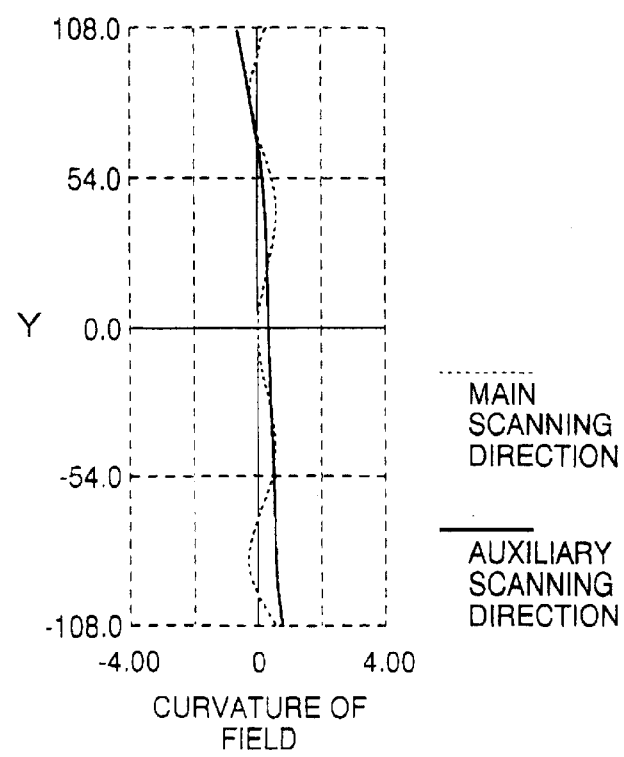
FIG. 17B is a graph showing a curvature of field with regard to the compensation lenses 52m and 52c according to the example of the second embodiment.

In FIGS. 17A and 17B optical performances of the inner-scanning optical system are indicated. FIG. 17A is a graph showing an fθ error characteristic according to the example of the second embodiment. FIG. 17B is a graph showing a curvature of field according to the example of the second embodiment. Each graph represents a characteristic when the scanning optical system 300 is assembled as it is designed. In FIG. 17B, a broken line shows the characteristic in the main scanning direction, and a solid line shows the characteristic in the auxiliary scanning direction. In each graph, a positive direction of the longitudinal axis corresponds to an upper direction in FIG. 14. As shown in FIGS. 17A and 17B, each amount of aberration in the scanning optical system according to the example of the second embodiment is extremely small. Therefore, the beam spot which should be formed at the center of the scanning line is actually formed at the center of the scanning line.

FIG. 18 is a graph showing an fθ error, where the compensation lens 52m (52c) is shifted to the positive side in the main scanning direction by 1.0 mm through the use of the screw 2b with respect to a position of the compensation lens 52m (52c) corresponding to the condition shown in FIGS. 17A and 17B. In this case, as can be seen by making a comparison between FIG. 18 and FIG. 17A, the beam spot which should be formed at the center of the scanning line (i.e., the beam spot of image height y=0) drifts by, approximately 0.03 mm to the negative side in the main scanning direction.

FIG. 19 is a graph showing an fθ error, where the compensation lens 52m (52c) is turned to the positive side in the main scanning plane (i.e., tuned counterclockwise in FIG. 14) by 1.0° through the use of the screws 1d and 2d. In this case, as can be seen by making a comparison between FIG. 17A and FIG. 19, the beam spot which should be formed at the center of the scanning line (i.e., the beam spot of image height y=0) drifts by approximately 0.06 mm to the negative side in the main scanning direction.

Since sensitivity of the adjustment can be obtained in such steps, if the shift amount of the beam spot is measured, then the displacement of the compensation lens 52m (52c) to perform the above mentioned adjustment can be determined.

In FIGS. 20A and 20B optical performances of the outer scanning optical system are indicated. FIG. 20A is a graph showing an fθ error characteristic according to the example of the second embodiment. FIG. 20B is a graph showing a curvature of field according to the example of the second embodiment. In FIG. 20B, a broken line shows the characteristic in the main scanning direction, and a solid line shows the characteristic in the auxiliary scanning direction. In each graph, a plus direction of the longitudinal axis corresponds to an upper direction in FIG. 14. As shown in FIGS. 20A and 20B, each amount of aberration in the scanning optical system according to the example of the second embodiment is extremely small. Therefore, the beam spot which should be formed at the center of the scanning line is actually formed at the center of the scanning line.

FIG. 21 is a graph showing an fθ error, where the compensation lens 52y (52b) is shifted to the positive side in the main scanning direction by 1.0 mm through the use of the screw 2b with respect to a position of the compensation lens 52y (52b) corresponding to the condition shown in FIGS. 20A and 20B. In this case, as can be seen by making a comparison between FIG. 21 and FIG. 20A, the beam spot which should be formed at the center of the scanning line (i.e., the beam spot of image height y=0) drifts by approximately 0.03 mm to the negative side in the main scanning direction.

FIG. 22 is a graph showing an fθ error, where the compensation lens 52y (52b) is turned to the positive side in the main scanning plane (i.e., tuned counterclockwise in FIG. 14) by 1.0° through the use of the screws 1d and 2d. In this case, as can be seen by making a comparison between FIG. 22 and FIG. 20A, the beam spot which should be formed at the center of the scanning line (i.e., the beam spot of image height y=0) drifts by approximately 0.06 mm to the negative side in the main scanning direction.

Since sensitivity of the adjustment can be obtained in such steps, if the shift amount of the beam spot is measured, then the displacement of the compensation lens 52y (52b) to perform the above mentioned adjustment can be determined.

Regarding conditions (1) and (2), the example of the second embodiment has the following values:

$f=200$ inner scanning optical system;

$fL=-3324.95$ $|f/fL|=0.060$ $\Delta X1(max)=2.709$ $\Delta X2(max)=0.000$ $|[\Delta X1(max)+\Delta X2(max)]/f|=0.014$ outer scanning optical system;

$fL=-3341.79$ $|f/fL|=0.060$ $\Delta X1(max)=2.583$ $\Delta X2(max)=0.000$ $|[\Delta X1(max)+\Delta X2(max)]/f|=0.013$ Since the fθ lens 50 according to the example of the second embodiment satisfies both of the conditions (1) and (2), sensitivity of the adjustment of the compensation lens becomes neither excessively low nor excessively high.

As described above, the scanning optical systems according to the embodiments are configured to adjust the position of the beam spot which should be formed at the center of the scanning line so that the beam spot is actually formed at the center of the scanning line.

The present disclosure relates to the subject matter contained in Japanese Patent Application No. 2001-344193, filed on Nov. 9, 2001, which is expressly incorporated herein by reference in its entirety.

What is claimed is:

1. A scanning optical system for emitting a plurality of laser beams scanning in a main scanning direction, comprising:

a deflector that deflects a plurality of laser beams to scan in the main scanning direction; and an imaging optical system that converges the plurality of laser beams deflected by said deflector to form a plurality of beam spots on surfaces to be scanned, respectively, the plurality of beam spots scanning on the surfaces to be scanned in the main scanning direction, respectively, wherein said imaging optical system has at least one lens whose position is changeable in a plane including an optical reference axis thereof and parallel with the main scanning direction, wherein said imaging optical system satisfies a condition:

$0.05 < |f/fL| < 0.5$ where, f represents a focal length of said imaging optical system in the main scanning direction; and fL represents a focal length of said at least one lens in the main scanning direction.

2. The scanning optical system according to claim 1, wherein said at least one lens is movable along a line parallel with the main scanning direction.

3. The scanning optical system according to claim 1, wherein said at least one lens is rotatable in the plane.

4. The scanning optical system according to claim 1, wherein said at least one lens has a first surface which is a light incident side thereof and a second surface opposite to said first surface, at least one of said first surface and said second surface being an aspherical surface, and wherein said at least one lens satisfies a condition:

$0.01 < |[\Delta X1(max)+\Delta X2(max)]/f| < 0.1$ where,

ΔX1(max) represents an amount of asphericity of said first surface at an outermost position on said first surface in the main scanning direction within an effective diameter of said first lens, the amount of asphericity of said first surface being defined as a difference between a SAG amount of a spherical surface having a curvature corresponding to that of said first surface at an optical reference axis thereof and tangential to said first surface at the optical reference axis and a SAG amount of said first surface;

ΔX2(max) represents an amount of asphericity of said second surface at an outermost position on said second surface in the main scanning direction within an effective diameter of said second lens, the amount of asphericity of said second surface being defined as a difference between a SAG amount of a spherical surface having a curvature corresponding to that of said second surface at an optical reference axis thereof and tangential to said second surface at the optical reference axis and a SAG amount of said second surface; and f is a focal length of said imaging optical system in the main scanning direction.

5. The scanning optical system according to claim 1, wherein said imaging optical system has:
   a scanning lens group being placed adjacent to said deflector; and
   a compensation lens provided on the side of the surfaces to be scanned with respect to said scanning lens group, said compensation lens compensating for curvature of field,
   wherein said at least one lens is a compensation lens.

6. The scanning optical system according to claim 1, wherein said imaging optical system has a scanning lens group that functions as a scanning lens, all of the plurality of laser beams passing through said scanning lens group.

7. The scanning optical system according to claim 6, wherein said imaging optical system has a compensation lens provided for each of the plurality of laser beams, said compensation lens compensating for curvature of field,
   wherein said scanning lens group being placed adjacent to said deflector, and
   wherein said at least one lens is a compensation lens provided for each of the plurality of laser beams.

8. The scanning optical system according to claim 1, wherein said imaging optical system has:
   a scanning lens provided for each of the plurality of laser beams, said scanning lens being placed adjacent to said deflector; and
   a compensation lens provided for each of the plurality of laser beams, said compensation lens compensating for curvature of field,
   wherein said at least one lens is a compensation lens provided for each of the plurality of laser beams.

9. A laser beam printer employing a scanning optical system for emitting a plurality of laser beams scanning in a main scanning direction,
   said scanning optical system comprising:
   a deflector that deflects a plurality of laser beams to scan in the main scanning direction; and
   an imaging optical system that converges the plurality of laser beams deflected by said deflector to form a plurality of beam spots on surfaces to be scanned, respectively, the plurality of beam spots scanning on the surfaces to be scanned in the main scanning direction, respectively,
   wherein said imaging optical system has at least one lens whose position is changeable in a plane including an optical reference axis thereof and parallel with the main scanning direction,
   wherein said imaging optical system satisfies a condition:

$$0.05 < |f/fL| < 0.5$$

where, f represents a focal length of said imaging optical system in the main scanning direction; and
   fL represents a focal length of said at least one lens in the main scanning direction.

10. The laser beam printer according to claim 9, wherein said at least one lens is movable along a line parallel with the main scanning direction.

11. The laser beam printer according to claim 9, wherein said at least one lens is rotatable in the plane.

12. The laser beam printer according to claim 9, wherein said at least one lens has a first surface which is a light incident side thereof and a second surface opposite to said first surface, at least one of said first surface and said second surface being an aspherical surface, and
    wherein said at least one lens satisfies a condition:

$$0.01 < |[\Delta X1(max) + \Delta X2(max)]/f| < 0.1$$

where,
    $\Delta X1(max)$ represents an amount of asphericity of said first surface at an outermost position on said first surface in the main scanning direction within an effective diameter of said first lens, the amount of asphericity of said first surface being defined as a difference between a SAG amount of a spherical surface having a curvature corresponding to that of said first surface at a optical reference axis thereof and tangential to said first surface at the optical reference axis and a SAG amount of said first surface;
    $\Delta X2(max)$ represents an amount of asphericity of said second surface at an outermost position on said second surface in the main scanning direction within an effective diameter of said second lens, the amount of asphericity of said second surface being defined as a difference between a SAG amount of a spherical surface having a curvature corresponding to that of said second surface at a optical reference axis thereof and tangential to said second surface at the optical reference axis and a SAG amount of said second surface; and
    f is a focal length of said imaging optical system in the main scanning direction.

13. The laser beam printer according to claim 9, wherein said imaging optical system has:
    a scanning lens group being placed adjacent to said deflector; and
    a compensation lens provided on the side of the surfaces to be scanned with respect to said scanning lens group, said compensation lens compensating for curvature of field,
    wherein said at least one lens is a compensation lens.

14. The laser beam printer according to claim 9, wherein said imaging optical system has a scanning lens group that functions as a scanning lens, all of the plurality of laser beams passing through said scanning lens group.

15. The laser beam printer according to claim 14, wherein said imaging optical system has a compensation lens provided for each of the plurality of laser beams, said compensation lens compensating for curvature of field,
    wherein said scanning lens group being placed adjacent to said deflector, and
    wherein said at least one lens is a compensation lens provided for each of the plurality of laser beams.

16. The laser beam printer according to claim 9, wherein said imaging optical system has:
    a scanning lens provided for each of the plurality of laser beams, said scanning lens being placed adjacent to said deflector; and
    a compensation lens provided for each of the plurality of laser beams, said compensation lens compensating for curvature of field,
    wherein said at least one lens is a compensation lens provided for each of the plurality of laser beams.

* * * * *